US012598323B2

(12) United States Patent　(10) Patent No.:　US 12,598,323 B2
Lee et al.　(45) Date of Patent:　Apr. 7, 2026

(54) INTER PREDICTION-BASED VIDEO ENCODING AND DECODING

(71) Applicants:HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

(72) Inventors: Min Hun Lee, Uijeongbu-si (KR); Myung Oh Hong, Gwangmyeong-si (KR); Dong Gyu Sim, Seoul (KR); Seung Wook Park, Yongin-si (KR)

(73) Assignees: HYUNDAI MOTOR COMPANY, Seoul (KR); KIA CORPORATION, Seoul (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 6 days.

(21) Appl. No.: 18/234,738

(22) Filed: Aug. 16, 2023

(65) Prior Publication Data

US 2023/0396795 A1　Dec. 7, 2023

Related U.S. Application Data

(63) Continuation of application No. PCT/KR2022/002472, filed on Feb. 18, 2022.

(30) Foreign Application Priority Data

Feb. 18, 2021 (KR) ........................ 10-2021-0021932
Feb. 18, 2022 (KR) ........................ 10-2022-0021410

(51) Int. Cl.
　　H04N 19/52　　(2014.01)
　　H04N 19/105　　(2014.01)
　　(Continued)

(52) U.S. Cl.
　　CPC ........... H04N 19/52 (2014.11); H04N 19/105 (2014.11); H04N 19/119 (2014.11);
　　(Continued)

(58) Field of Classification Search
　　CPC .... H04N 19/52; H04N 19/105; H04N 19/119; H04N 19/139; H04N 19/167;
　　(Continued)

(56) References Cited

U.S. PATENT DOCUMENTS 10,652,536 B2　5/2020　Lim et al.
11,350,091 B2　5/2022　Lim et al.
(Continued)

FOREIGN PATENT DOCUMENTS

KR　　20190062585 A　　6/2019
KR　　20200034639 A　　3/2020
(Continued)

OTHER PUBLICATIONS

JVET-R0357.*

(Continued)

*Primary Examiner* — Shadan E Haghani
(74) *Attorney, Agent, or Firm* — Lempia Summerfield Katz LLC

(57) ABSTRACT

A video decoding method is disclosed. The method includes: determining a partitioning structure of the target block; reconstructing motion vectors, which correspond to a plurality of partitions split from the target block by the partitioning structure of the target block; using the motion vectors to generate prediction blocks that respectively correspond to the partitions and are equal in size to the target (Continued)

block; generating a prediction block of the target block by weighted averaging the prediction blocks corresponding to the partitions; and reconstructing the target block based on the prediction block of the target block.

9 Claims, 17 Drawing Sheets

(51) Int. Cl.

| | |
|---|---|
| *H04N 19/119* | (2014.01) |
| *H04N 19/139* | (2014.01) |
| *H04N 19/167* | (2014.01) |
| *H04N 19/176* | (2014.01) |
| *H04N 19/70* | (2014.01) |

(52) U.S. Cl.
CPC ......... *H04N 19/139* (2014.11); *H04N 19/167* (2014.11); *H04N 19/176* (2014.11); *H04N 19/70* (2014.11)

(58) Field of Classification Search
CPC .... H04N 19/176; H04N 19/70; H04N 19/513; H04N 19/96
See application file for complete search history.

(56) References Cited

U.S. PATENT DOCUMENTS

| | | | |
|---|---|---|---|
| 11,470,312 | B2 | 10/2022 | Lee |
| 11,470,347 | B2 | 10/2022 | Jeong et al. |
| 11,695,926 | B2 | 7/2023 | Kang et al. |
| 2008/0304569 | A1* | 12/2008 | Lee ..................... H04N 19/543 375/E7.125 |
| 2009/0196342 | A1* | 8/2009 | Divorra Escoda ..... H04N 19/57 375/E7.126 |
| 2013/0266061 | A1* | 10/2013 | An ........................ H04N 19/86 375/240.02 |
| 2019/0342550 | A1 | 11/2019 | Lim et al. |
| 2020/0236358 | A1 | 7/2020 | Lim et al. |
| 2021/0127134 | A1 | 4/2021 | Jeong et al. |
| 2021/0227247 | A1 | 7/2021 | Blaeser et al. |
| 2021/0337196 | A1 | 10/2021 | Lee |
| 2021/0352280 | A1 | 11/2021 | Kang et al. |
| 2022/0150470 | A1* | 5/2022 | Sim ..................... H04N 19/139 |
| 2022/0150488 | A1 | 5/2022 | Lim et al. |
| 2022/0337832 | A1 | 10/2022 | Lee |
| 2022/0337833 | A1 | 10/2022 | Lee |
| 2023/0032531 | A1 | 2/2023 | Jeong et al. |
| 2023/0037705 | A1 | 2/2023 | Jeong et al. |
| 2023/0038846 | A1 | 2/2023 | Jeong et al. |
| 2023/0043259 | A1 | 2/2023 | Jeong et al. |
| 2023/0048262 | A1* | 2/2023 | Sim ........................ H04N 19/86 |

FOREIGN PATENT DOCUMENTS

| | | | |
|---|---|---|---|
| KR | 20200054104 A | | 5/2020 |
| KR | 20200093674 A | | 8/2020 |
| KR | 20210103731 A | * | 8/2021 |
| WO | 2020073896 A1 | | 4/2020 |

OTHER PUBLICATIONS

JVET-R2002.*
JVET-V0103.*
JVET-V0125.*
International Search Report and Written Opinion cited in corresponding international app No. PCT/KR2022/002472 May 26, 2022; 9 pp.

* cited by examiner

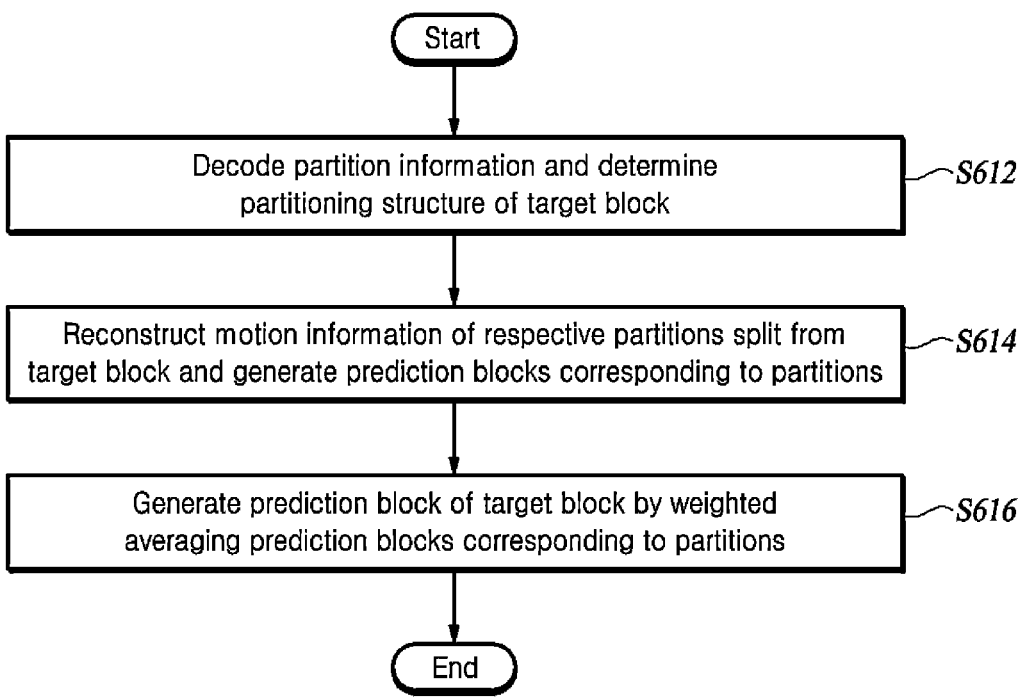

Start

Decode partition information and determine
partitioning structure of target block     ⌐S612

Reconstruct motion information of respective partitions split from
target block and generate prediction blocks corresponding to partitions     ⌐S614

Generate prediction block of target block by weighted
averaging prediction blocks corresponding to partitions     ⌐S616

End

*FIG. 6B*

Direction Table

| dir$_{index}$ | SignX | SignY |
|---|---|---|
| 0 | + | + |
| 1 | + | 0 |
| 2 | + | − |
| 3 | 0 | + |
| 4 | 0 | − |
| 5 | − | + |
| 6 | − | 0 |
| 7 | − | − |

Distance Table

| dis$_{index}$ | Distance |
|---|---|
| 0 | 1 |
| 1 | 2 |
| 2 | 4 |
| 3 | 8 |

FIG. 9

Weighted Value Mask

Prediction Block
Corresponding to Partition 1 bound_sec1(i,j)

bound_sec2(i,j)

pred_sec1(i,j)
Prediction Block Corresponding to Partition 1 pred_sec2(i,j)
Prediction Block Corresponding to Partition 2

Partition 1
Partition 2

| 8 | 8 | 8 | 8 | 7 | 6 | 5 | 5 | 4 | 3 | 2 | 2 |
|---|---|---|---|---|---|---|---|---|---|---|---|
| 8 | 8 | 8 | 7 | 6 | 5 | 4 | 4 | 4 | 3 | 2 | 1 |
| 8 | 8 | 8 | 7 | 6 | 5 | 4 | 3 | 3 | 3 | 2 | 1 |
| 8 | 8 | 7 | 6 | 5 | 5 | 4 | 3 | 2 | 2 | 1 | 0 |
| 8 | 7 | 6 | 5 | 5 | 4 | 4 | 3 | 2 | 1 | 0 | 0 |
| 7 | 6 | 5 | 4 | 4 | 4 | 3 | 3 | 2 | 1 | 0 | 0 |
| 7 | 6 | 5 | 4 | 3 | 3 | 3 | 2 | 1 | 0 | 0 | 0 |
| 7 | 6 | 5 | 4 | 3 | 2 | 2 | 1 | 2 | 1 | 0 | 0 |
| 7 | 6 | 5 | 4 | 3 | 3 | 3 | 3 | 3 | 2 | 1 | 0 |
| 7 | 6 | 5 | 4 | 4 | 4 | 4 | 4 | 3 | 3 | 2 | 1 |
| 8 | 7 | 6 | 5 | 5 | 5 | 5 | 4 | 4 | 3 | 2 | 1 |
| 8 | 8 | 7 | 6 | 6 | 6 | 6 | 5 | 4 | 3 | 2 | 1 |

Normal Edge

| 8 | 8 | 8 | 8 | 8 | 8 | 8 | 8 | 8 | 0 | 0 | 0 |
|---|---|---|---|---|---|---|---|---|---|---|---|
| 8 | 8 | 8 | 8 | 8 | 8 | 8 | 8 | 8 | 0 | 0 | 0 |
| 8 | 8 | 8 | 8 | 8 | 8 | 8 | 0 | 0 | 0 | 0 | 0 |
| 8 | 8 | 8 | 8 | 8 | 8 | 8 | 0 | 0 | 0 | 0 | 0 |
| 8 | 8 | 8 | 8 | 8 | 8 | 8 | 0 | 0 | 0 | 0 | 0 |
| 8 | 8 | 8 | 8 | 8 | 8 | 0 | 0 | 0 | 0 | 0 | 0 |
| 8 | 8 | 8 | 8 | 0 | 0 | 0 | 0 | 0 | 0 | 0 | 0 |
| 8 | 8 | 8 | 8 | 0 | 0 | 0 | 0 | 0 | 0 | 0 | 0 |
| 8 | 8 | 8 | 8 | 0 | 0 | 0 | 0 | 0 | 0 | 0 | 0 |
| 8 | 8 | 8 | 8 | 8 | 8 | 8 | 8 | 0 | 0 | 0 | 0 |
| 8 | 8 | 8 | 8 | 8 | 8 | 8 | 8 | 8 | 0 | 0 | 0 |
| 8 | 8 | 8 | 8 | 8 | 8 | 8 | 8 | 8 | 0 | 0 | 0 |

Sharp Edge

FIG. 12A     FIG. 12B

Subblock Partitioning

☐ Subblock Area

☐ Overlapping Area

Subblockwise Partition Boundary Map bound_sec_1_2_1(i,j)

bound_sec_1_2_2(i,j)

bound_sec_1_3_1(i,j)

bound_sec_1_3_3(i,j)

bound_sec_2_3_2(i,j)

bound_sec_2_3_3(i,j)

INTER PREDICTION-BASED VIDEO ENCODING AND DECODING

CROSS-REFERENCE TO RELATED APPLICATION

This application is a continuation application of International Application No. PCT/KR2022/002472, filed on Feb. 18, 2022, which claims priority from Korean Patent Application No. 10-2021-0021932 filed on Feb. 18, 2021, and Korean Patent Application No. 10-2022-0021410 filed on Feb. 18, 2022, the disclosures of each of which are incorporated by reference herein in their entirety.

TECHNICAL FIELD

The present disclosure relates to an inter-prediction-based video encoding and decoding.

BACKGROUND

The statements in this section merely provide background information related to the present disclosure and do not necessarily constitute prior art.

Compared to voice data or still image data, a large amount of video data unprocessed or uncompressed requires a lot of hardware resources, including memory, to store or transmit in its original form.

Accordingly, when storing or transmitting video data, an encoder is typically used to compress the video data to store or transmit the video data, and a decoder receives the compressed video data and performs decompression and reconstruction thereof. Such video compression technologies include H.264/AVC, High Efficiency Video Coding (HEVC), and Versatile Video Coding (VVC), which improves the encoding efficiency of HEVC by about 30% or more.

However, due to the gradual increase in size, resolution, and frame rate of videos, and accordingly the increased amount of data that needs to be coded, new compression technology needs to be provided with more efficiency in coding and more effectiveness in improving image quality than existing compression technologies.

SUMMARY

The present disclosure provides a video encoding/decoding method that predicts a target block by splitting the target block into blocks of various shapes. Further, the present disclosure provides a method of efficiently encoding information about the block partitions.

The present disclosure in at least one aspect provides a method of decoding a video by using inter prediction. The method includes decoding partition information to be used for splitting a target block. The partition information includes an initial motion vector indicating a position of a reference block to be referred to for determining a partitioning structure of the target block. The method also includes determining a partitioning structure of the reference block indicated by the initial motion vector. The method also includes using the partitioning structure of the reference block to determine the partitioning structure of the target block. The method also includes reconstructing motion vectors corresponding respectively to a plurality of partitions split from the target block by the partitioning structure of the target block. The method also includes using the motion vectors to generate prediction blocks that correspond to the partitions and are equal in size to the target block. The method also includes generating a prediction block of the target block by weighted averaging first prediction blocks corresponding to the partitions.

Another aspect of the present disclosure provides a method of encoding a video by using inter prediction. The method includes determining a partitioning structure of a reference block in a reference picture. The method also includes setting a partitioning structure of a target block by using the partitioning structure of the reference block. The method also includes determining motion vectors corresponding respectively to a plurality of partitions split from the target block by the partitioning structure of the target block. The method also includes generating prediction blocks corresponding respectively to the partitions by using the motion vectors. The method also includes generating a prediction block of the target block by weighted averaging the prediction blocks corresponding to the partitions. The method also includes encoding partition information including an initial motion vector for indicating a position of the reference block used to determine the partitioning structure of the target block.

Yet another aspect of the present disclosure provides a recording medium, readable by a decoder, storing a bitstream generated by the video encoding method as described above.

BRIEF DESCRIPTION OF THE DRAWINGS

FIG. 6B is a schematic flowchart illustrating a method performed by a video decoding apparatus for predicting a block according to the present disclosure.

FIG. 9 illustrates tables representing a predefined plurality of directions and distances associated with a differential motion vector, respectively.

FIG. 12A and FIG. 12B are diagrams illustrating a method of assigning weights based on the split boundary type.

DETAILED DESCRIPTION

Figure 1:
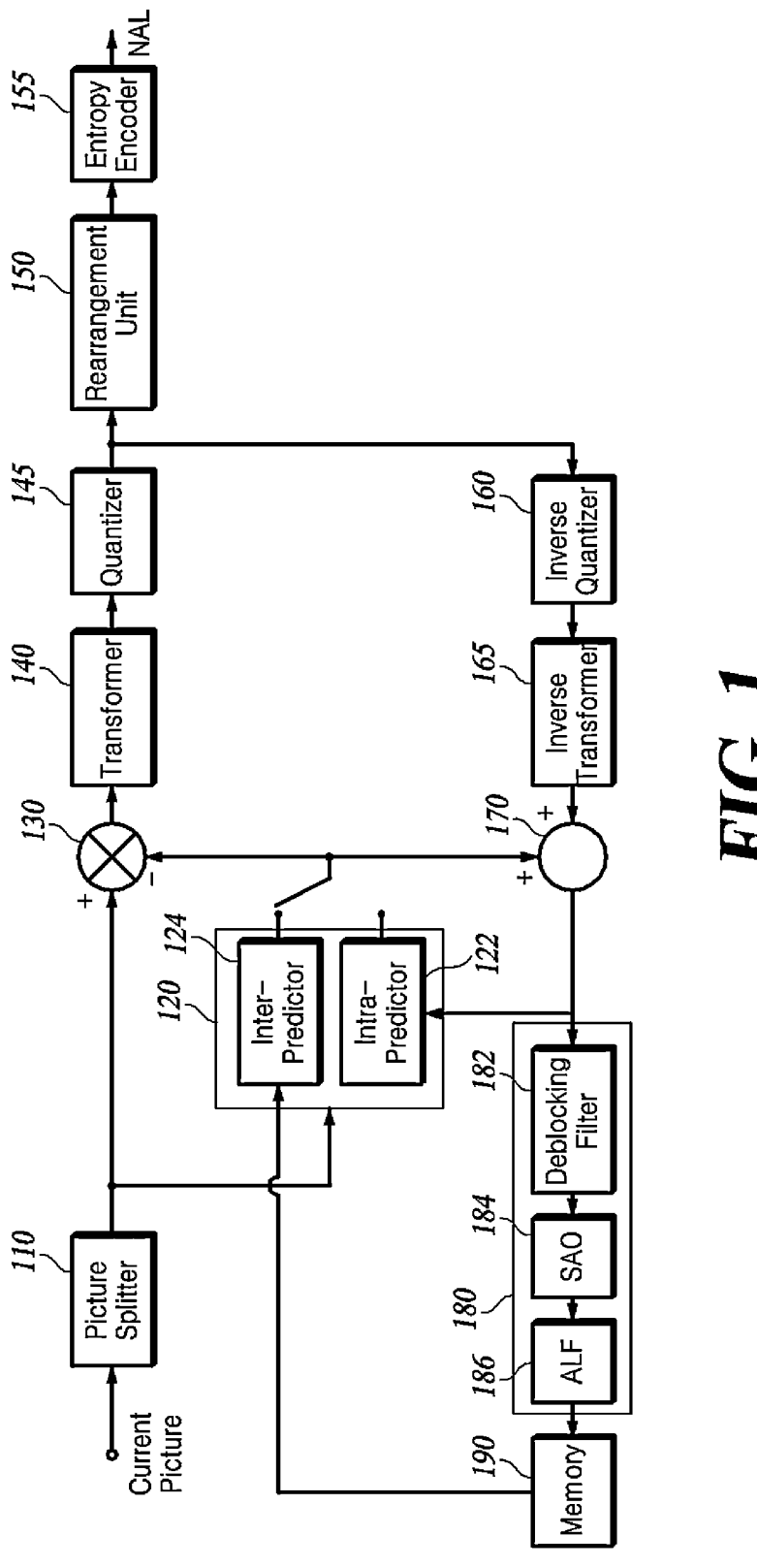
FIG. 1 is a block diagram illustrating a video encoding apparatus capable of implementing the techniques of the present disclosure.

Hereinafter, some embodiments of the present disclosure are described in detail with reference to the accompanying illustrative drawings. In the following description, like reference numerals designate like elements, although the elements are shown in different drawings. Further, in the following description of some embodiments, a detailed description of related known components and functions, when considered to obscure the subject of the present disclosure, has been omitted for the purpose of clarity and for brevity.

FIG. 1 is a block diagram illustrating a video encoding apparatus capable of implementing the techniques of the present disclosure. Hereinafter, a video encoding apparatus and its sub-components are described with reference to FIG. 1.

The video encoding apparatus may be configured to include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

The respective components of the video encoding apparatus may be implemented as hardware or software or implemented as hardware and software combined. Additionally, the function of each component may be implemented by software, and the function by software for each component may be implemented to be executed by a microprocessor.

A video is composed of one or more sequences of pictures. The pictures are each divided into a plurality of regions, and encoding is performed for each region. For example, one picture is divided into one or more tiles or/and slices. Here, one or more tiles may be defined as a tile group. Each tile or slice is divided into one or more Coding Tree Units (CTUs). In addition, each CTU is divided into one or more Coding Units (CUs) by a tree structure. Information items that are applied to the respective CUs are encoded as the CUs' syntaxes, and information that are commonly applied to CUs included in one CTU is encoded as the one CTU's syntax. Additionally, information that is commonly applied to all blocks in one slice is encoded as the one slice header's syntax, and information that applied to all blocks constituting one or more pictures is encoded in a Picture Parameter Set (PPS) or the one or more pictures' header(s). Furthermore, information items that are commonly referenced by multiple pictures are encoded in a Sequence Parameter Set (SPS). Additionally, information items commonly referenced by one or more SPSs are encoded in a Video Parameter Set (VPS). Additionally, information that is common to a tile or a tile group may be encoded as the tile header's or the tile group header's syntax. Syntaxes contained in the SPS, the PPS, slice header, the tile or the tile group header can be referred to as high-level syntaxes.

The picture splitter 110 determines the size of the coding tree unit (CTU). The information on the size of the CTU is encoded as a syntax of the SPS or PPS and transmitted to the video decoding apparatus.

The picture splitter 110 divides each picture comprising the video into a plurality of Coding Tree Units (CTUs) having a predetermined size and then divides the CTUs by recursively using a tree structure. A leaf node in the tree structure becomes a coding unit (CU), which is the basic unit of coding.

The tree structure may include a QuadTree (QT) in which an upper-level node (or parent node) is partitioned into four lower-level nodes (or child nodes) of equal size. The tree structure may also include a BinaryTree (BT) in which a parent node is partitioned into two child nodes. The tree structure may also include a TernaryTree (TT) in which a parent node is partitioned into three child nodes in a 1:2:1 ratio. The tree structure may also include a mixture of two or more of these QT, BT, and TT structures. For example, a QuadTree plus BinaryTree (QTBT) structure may be used, or a QuadTree plus BinaryTree TernaryTree (QTBTTT) structure may be used. These structures and BTTT may be collectively referred to as a Multiple-Type Tree (MTT).

Figure 2:
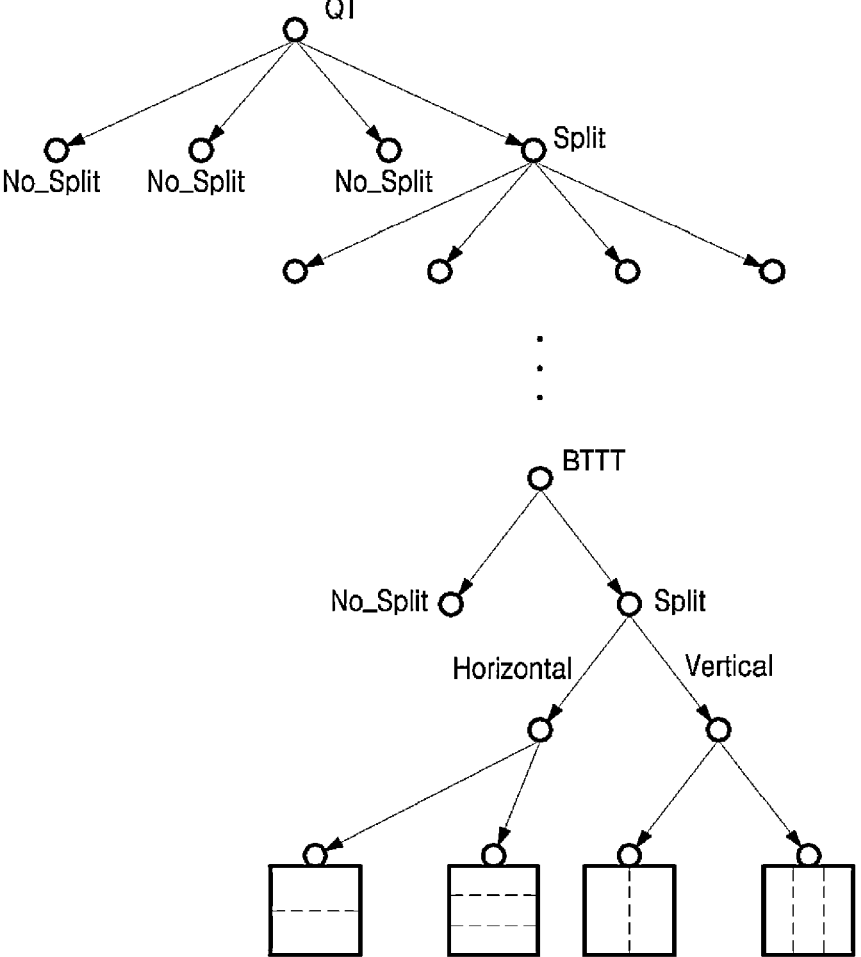
FIG. 2 is a diagram illustrating a method for partitioning a block by using a QuadTree plus BinaryTree TernaryTree (QTBTTT) structure.

FIG. 2 is a diagram illustrating a method for partitioning a block by using a QTBTTT structure.

As illustrated in FIG. 2, the CTU may first be partitioned into a QT structure. The quadtree partitioning may be recursively performed until the size of the splitting block reaches the minimum block size (MinQTSize) of the leaf nodes allowed in the QT. A first flag (QT_split_flag) indicating whether each node of the QT structure is to be partitioned into four nodes of the lower layer is encoded by the entropy encoder 155 and signaled to the video decoding apparatus. When the leaf node of the QT is not larger than the maximum block size (MaxBTSize) of the root node allowed in the BT, the leaf node of the QT may be further split into one or more of the BT structure or the TT structure. A BT structure and/or TT structure may have multiple splitting directions. For example, the BT structure and/or TT structure may have two directions, i.e., horizontal and vertical directions in which the blocks at a given node are partitioned. As illustrated in FIG. 2, when MTT splitting begins, a second flag (mtt_split_flag) indicating whether or not the nodes have been split is encoded by the entropy encoder 155 and signaled to the video decoding apparatus, and in case the nodes were split, a further flag indicating the direction of the split (vertical or horizontal) and/or a further flag indicating the type of split (binary or ternary) are encoded by the entropy encoder 155 and signaled to the video decoding apparatus.

Alternatively, before encoding the first flag (QT_split_flag), which indicates whether each node is split into four nodes of the sublayer, a CU split flag (split_cu_flag), which indicates whether that node is split, may be encoded. When the value of the CU split flag (split_cu_flag) indicates that the node is not split, the block at that node becomes a leaf node in the split tree structure and becomes a CU (coding unit), which is the basic unit of coding. When the value of the CU split flag (split_cu_flag) indicates that the node is split, the video encoding apparatus starts encoding from the first flag in the manner described above.

As yet another example of the tree structure, when QTBT is used, there may be two types of partition including a type that horizontally splits the block of the relevant node into two equally sized blocks (i.e., symmetric horizontal splitting) and including a type that vertically splits the same (i.e., symmetric vertical splitting). A split flag (split_flag) indicating whether each node of the BT structure is split into sublayer blocks and the split type information, which indicates the type of splitting, are encoded by the entropy encoder 155 and transmitted to the video decoding apparatus. Meanwhile, there may be a further type of splitting the block of the relevant node into two asymmetrical blocks. The asymmetric form may include a form of the block of the relevant node being split into two rectangular blocks having a size ratio of 1:3 or may include a form of the block of the relevant node being split in a diagonal direction.

The CU may have various sizes depending on the QTBT or QTBTTT partitioning from the CTU. Hereinafter, a block corresponding to a CU to be encoded or decoded (i.e., a leaf node of QTBTTT) is referred to as a 'current block'. Depending on whether or not the QTBTTT partitioning is employed, the shape of the current block may be rectangular as well as square.

The predictor 120 predicts the current block to generate a prediction block. The predictor 120 includes an intra predictor 122 and an inter predictor 124.

In general, the current blocks in a picture may each be predictively coded. Prediction of the current block may be generally performed by using intra prediction techniques or inter prediction techniques. The intra prediction techniques use data from the very picture containing the current block, and the inter prediction techniques use data from the preceding picture coded before the picture containing the current block. Inter prediction includes both unidirectional prediction and bidirectional prediction.

Figure 3A:
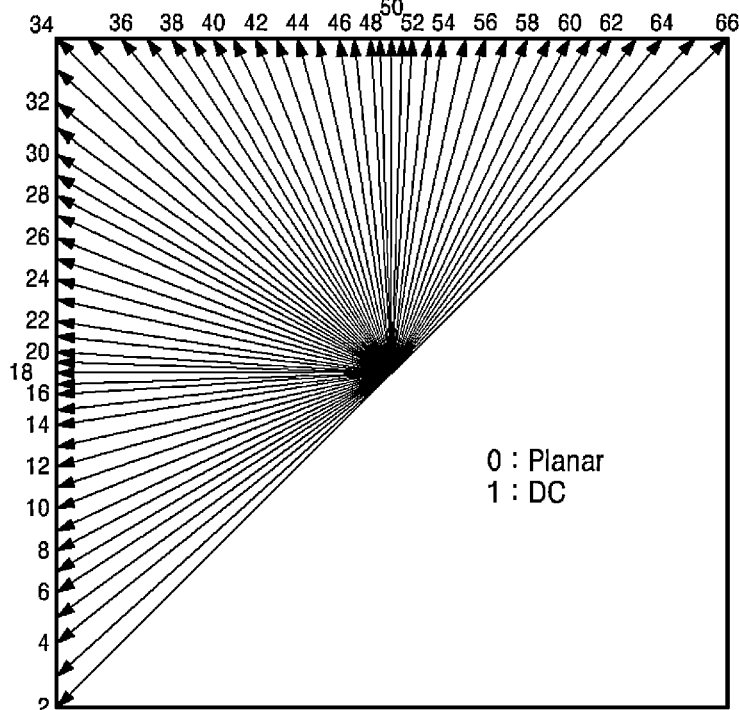
FIGS. 3A and 3B are diagrams illustrating a plurality of intra prediction modes, including wide-angle intra prediction modes.

The intra predictor 122 predicts the pixels in the current block by using the peripheral pixels (reference pixels) located around the current block in the current picture. Different prediction directions present multiple corresponding intra-prediction modes. For example, as shown in FIG. 3A, the multiple intra-prediction modes may include two non-directional modes, including a planar mode and a DC mode, and may include 65 directional modes. The respective prediction modes provide differently defined peripheral pixels and equations to use.

Figure 3B:
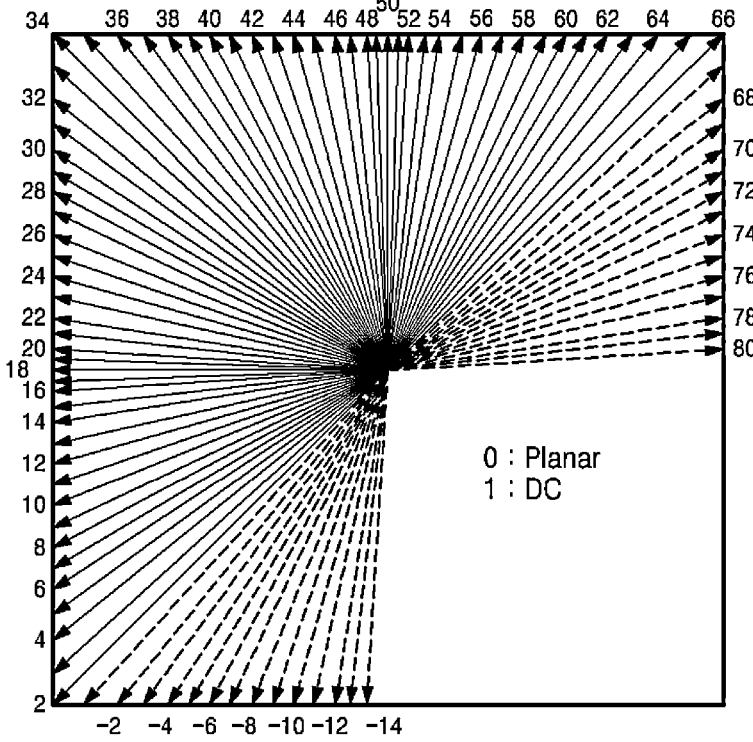

For efficient directional prediction for rectangular-shaped current blocks, additional directional modes (intra-prediction modes 67 through 80, −1 through −14) may be used, as illustrated by the dashed arrows in FIG. 3B. These may be referred to as "wide angle intra-prediction modes". In FIG. 3B, the arrows point to the corresponding reference samples used for prediction and do not indicate prediction directions. The prediction directions are opposite to the directions indicated by the arrows. The wide-angle intra-prediction modes are modes that perform a prediction in the opposite direction to a particular directional mode without additional bit transfers when the current block is rectangular. In this case, among the wide-angle intra-prediction modes, some wide-angle intra-prediction modes may be determined to be available for a rectangular current block depending on the ratio of the width and height of that current block. For example, wide-angle intra-prediction modes having an angle less than 45 degrees (intra-prediction modes 67 through 80) are available for the current block when having a rectangular shape with a height less than the width. Wide-angle intra-prediction modes having an angle of −135 degrees or greater (intra-prediction modes −1 through −14) are available for the current block when having a rectangular shape with a height greater than a width.

The intra predictor 122 may determine which intra-prediction mode to use to encode the current block. In some examples, the intra predictor 122 may use multiple intra-prediction modes to encode the current block and may select the appropriate intra-prediction mode to use from the tested modes. For example, the intra predictor 122 may use a rate-distortion analysis of the multiple tested intra-prediction modes to calculate rate-distortion values and may select the intra-prediction mode with the best rate-distortion characteristics among the tested modes.

The intra predictor 122 selects one intra-prediction mode from the plurality of intra-prediction modes and predicts the current block by using the neighboring pixels (reference pixels) and an operation expression determined according to the selected intra-prediction mode. The information on the selected intra-prediction mode is encoded by the entropy encoder 155 and transmitted to the video decoding apparatus.

The inter predictor 124 generates a prediction block for the current block by using a motion compensation process. The inter predictor 124 searches for a block most similar to the current block over the reference picture that was encoded and decoded before the current picture, and the inter predictor 124 uses the searched block to generate a prediction block of the current block. Then, the inter predictor 124 generates a motion vector (MV) corresponding to the displacement between the current block in the current picture and the prediction block in the reference picture. In general, motion estimation is performed on the luma component, and the motion vector computed based on the luma component is used for both the luma and chroma components. The motion information, including information on the reference picture used to predict the current block and information on the motion vectors, is encoded by the entropy encoder 155 and transferred to the video decoding apparatus.

To improve the accuracy of the prediction, the inter predictor 124 may perform interpolation of the reference picture or reference block. For example, the subsamples between two consecutive integer samples are interpolated by applying filter coefficients to a plurality of consecutive integer samples including the two integer samples. By performing a search for the block most similar to the current block with respect to the interpolated reference picture, the motion vector can be represented to a precision of decimal units rather than integer sample units. The precision or resolution of the motion vector may be set differently for different units of the target area to be encoded, such as slices, tiles, CTUs, CUs, etc. When such adaptive motion vector resolution (AMVR) is applied, information on the motion vector resolution to be applied to each target area needs to be signaled per target area. For example, when the target area is a CU, information on the applied motion vector resolution is signaled for each CU. The information on the motion vector resolution may be information on the precision of a differential motion vector to be described below.

Meanwhile, the inter predictor 124 may perform inter prediction by using bi-prediction. For bi-prediction, two reference pictures and two motion vectors representing block positions most similar to the current block within each reference picture are used. The inter predictor 124 selects a first reference picture from the reference picture list 0 (RefPicList0) and selects a second reference picture from the reference picture list 1 (RefPicList1), respectively. The inter predictor 124 generates a first reference block and a second reference block by searching for blocks similar to the current block within the respective reference pictures. Then, the inter predictor 124 performs averaging or weight averaging of the first reference block and the second reference block to generate a prediction block of the current block. Then, the inter predictor 124 sends the encoding unit 150 the motion information, including information on the two reference pictures used to predict the current block and information on the two motion vectors. Here, a reference picture list 0 may be composed of pictures before the current picture in the display sequence among the reconstructed pictures, and reference picture list 1 may be composed of pictures after the current picture in the display sequence among the reconstructed pictures. However, the present disclosure does not require, but it may further include reconstructed pictures after the current picture in the display sequence may be included in reference picture list 0. Conversely, the present disclosure does not require, but it may further include reconstructed pictures before the current picture in reference picture list 1.

Various methods may be used to minimize the number of bits required to encode the motion information.

For example, where the reference picture and motion vector of the current block are the same as the reference picture and motion vector of a neighbor block, encoding such information that can identify the neighbor block will allow the motion information of the current block to be transferred to the video decoding apparatus. This method is referred to as "merge mode."

In the merge mode, the inter predictor 124 selects, from the neighbor blocks of the current block, a predetermined number of merge candidate blocks (hereinafter referred to as "merge candidates").

Figure 4:
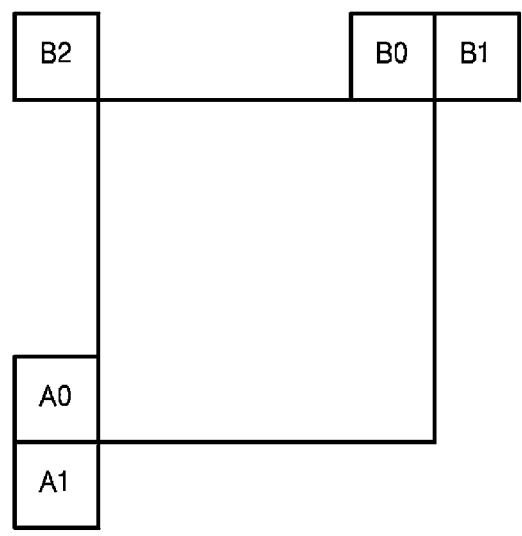
FIG. 4 a diagram illustrating neighbor blocks of a current block.

FIG. 4 illustrates the current block and its neighbors in the current picture, and the current block has the neighbor blocks for deriving the merge candidates, including a left block A0, bottom left block A1, top block B0, top right block B1, and top left block A2 in whole or in part. Additionally, other than the current picture in which the current block is located, a reference picture (the same as or different from the reference picture used to predict the current block) may have internal blocks that may be used as merge candidates. For example, available merge candidates to be further used may include a block that is in the reference picture and co-located with the current block or may include blocks that are adjacent to the co-located block. Where the number of merge candidates selected by the method described above is less than the preset number, a zero vector(s) is added to the merge candidates.

The inter predictor 124 uses these neighbor blocks to construct a merge list including a predetermined number of merge candidates. Among the merge candidates in the merge list, the inter predictor 124 selects a merge candidate to be used as the motion information of the current block and generates merge index information to identify the selected candidate. The generated merge index information is encoded by the encoding unit 150 and transmitted to the video decoding apparatus.

A merge skip mode, a special case of the merge mode, transmits, after performing quantization, and when the transform coefficients for entropy encoding are all close to zero, only the peripheral block selection information without transmitting residual signals. By utilizing the merge skip mode, a relatively high encoding efficiency can be achieved for images with little movement, still images, and screen content images, etc.

Hereinafter, the merge mode and the merge skip mode are collectively referred to as merge/skip mode.

Another method for encoding motion information is the advanced motion vector prediction (AMVP) mode.

In AMVP mode, the inter predictor 124 uses the neighbor blocks of the current block to derive candidate predicted motion vectors for the current block's motion vector. The neighbor blocks used to derive the candidate predicted motion vectors may include any or all of the left block A0, the bottom left block A1, the top block B0, the top right block B1, or the top left block A2 adjacent to the current block in the current picture shown in FIG. 4. Additionally, blocks located not in the current picture containing the current block but within a reference picture (the same as or different from the reference picture used to predict the current block) may be used as neighbor blocks used to derive candidate predicted motion vectors. For example, blocks that are in the reference picture and collocated with the current block, or blocks that are adjacent to such collocated block, may be used. When the number of motion vector candidates is less than the preset number by the method described above, a zero vector(s) is added to the motion vector candidates.

The inter predictor 124 uses the motion vectors of the neighbor blocks to derive candidate predicted motion vectors and uses the candidate predicted motion vectors to determine a predicted motion vector of the current block's motion vector. Then, the inter predictor 124 subtracts the predicted motion vector from the motion vector of the current block to calculate and generate a differential motion vector.

The predicted motion vector may be obtained by applying a predefined function (e.g., a median, mean value operation, etc.) to the candidate predicted motion vectors. In this case, the video decoding apparatus also knows the predefined function. Additionally, since the neighbor blocks used to derive the candidate predicted motion vectors are already encoded and decoded blocks, the video decoding apparatus also knows the motion vectors of the neighbor blocks, too. Therefore, the video encoding apparatus does not need to encode the information to identify the candidate predicted motion vectors. Therefore, in this case, the present disclosure may predict the information on the differential motion vector and the information on the reference picture used to predict the current block.

Alternatively, the predicted motion vector may be determined in a manner of selecting one of the candidate predicted motion vectors. In this case, the present disclosure may further encode information for identifying the selected candidate predicted motion vector, along with information on the differential motion vector and information on the reference picture used to predict the current block.

The subtractor 130 subtracts from the current block the prediction block generated by the intra predictor 122 or inter predictor 124 to generate a residual block.

The transformer 140 transforms the residual signals in the residual block having pixel values in the spatial domain into transform coefficients in the frequency domain. The transformer 140 may transform the residual signals in the residual block by using the entire size of the residual block as the transform unit, or the transformer 140 may divide the residual block into a plurality of subblocks and may use such a subblock as the transform unit to perform the transform. Alternatively, the transformer 140 may divide the residual block into two subblocks of a transform area and a non-transform area and may use only the transform-area subblock as the transform unit to transform the residual signals. Here, the transform-area subblock may be one of two rectangular blocks with a 1:1 size ratio along the horizontal (or vertical) axis. In this case, a flag (cu_sbt_flag) indicating that exclusive subblock transform has been performed, directional (vertical/horizontal) information (cu_sbt_horizontal_flag), and/or position information (cu_sbt_pos_flag) are encoded by the entropy encoder 155 and signaled to the video decoding apparatus. Further, the transform-area subblock may have a size ratio of 1:3 with respect to the horizontal axis (or vertical axis), and in this case, a flag (cu_sbt_quad_flag) for distinguishing the corresponding partition is further encoded by the entropy encoder 155 and signaled to the video decoding apparatus.

On the other hand, the transformer 140 may perform a transform on the residual block in the horizontal direction and the vertical direction separately. For the transform, various types of transform functions or transform matrices may be used. For example, a pair of transform functions for horizontal and vertical transforms may be defined as a multiple transform set (MTS). The transformer 140 may select, among the MTS, one transform function pair with the best transform efficiency and may transform the residual blocks in the horizontal and vertical directions, respectively. The information (mts_idx) of the selected transform function pair among the MTS is encoded by the entropy encoder 155 and signaled to the video decoding apparatus.

The quantizer 145 quantizes the transform coefficients outputted from the transformer 140 by using quantization parameters and outputs the quantized transform coefficients to the entropy encoder 155. The quantizer 145 may quantize the associated residual blocks with a certain block or frame, directly without a transform. The quantizer 145 may apply different quantization coefficients (scaling values) depending on the position of the transform coefficients in the transform block. The quantization matrix applied to the quantized transform coefficients arranged in two dimensions may be encoded and signaled to the video decoding apparatus.

The rearrangement unit 150 may perform a reordering of the coefficient values for the quantized residuals.

The rearrangement unit 150 may utilize coefficient scanning to change a two-dimensional coefficient array into a one-dimensional coefficient sequence. For example, the rearrangement unit 150 may use a zig-zag scan or a diagonal scan to scan from the DC coefficients to the coefficients in the high-frequency domain to output a one-dimensional coefficient sequence. According to the size of the transform unit and the intra-prediction mode, the rearrangement unit 150 may omit a zig-zag scan and may instead use a vertical scan, which scans the two-dimensional coefficient array in the column direction, and a horizontal scan, which scans the two-dimensional block shape coefficients in the row direction. In other words, the size of the transform unit and the intra-prediction mode may determine which scan method is used among a zig-zag scan, diagonal scan, vertical scan, and horizontal scan.

The entropy encoder 155 generates a bitstream by encoding a sequence of one-dimensional quantized transform coefficients outputted from the rearrangement unit 150 by using various encoding schemes, such as context-based adaptive binary arithmetic code (CABAC) and Exponential-Golomb.

Further, the entropy encoder 155 encodes information such as CTU size, CU split flag, QT split flag, MTT split type, MTT split direction, etc. related to the block partition, allowing the video decoding apparatus to partition the block as the video encoding apparatus did. Further, the entropy encoder 155 encodes information on the prediction type, which indicates whether the current block is encoded by intra prediction or inter prediction, and the entropy encoder 155 encodes, according to the prediction type, intra prediction information, i.e., information on the intra-prediction mode, or inter prediction information. The inter prediction information includes information on the encoding mode (i.e., merge mode or AMVP mode) of motion information, information on the merge index in case of the merge mode, information on the reference picture index in case of the AMVP mode, and information on the differential motion vector. Additionally, the entropy encoder 155 encodes information related to quantization, i.e., information on quantization parameters and information on quantization matrices.

The inverse quantizer 160 inversely quantizes the quantized transform coefficients outputted from the quantizer 145 to generate the transform coefficients. The inverse transformer 165 transforms the transform coefficients outputted from the inverse quantizer 160 from the frequency domain to the space domain to reconstruct the residual block.

The adder unit 170 adds the reconstructed residual block and the prediction block generated by the predictor 120 to reconstruct the current block. The pixels in the reconstructed current block are used as reference pixels when intra-predicting the next block in sequence.

The loop filter section 180 performs filtering on the reconstructed pixels to reduce blocking artifacts, ringing artifacts, blurring artifacts, etc. caused by block-based prediction and transform/quantization. The filter unit 180 is an in-loop filter and may include a deblocking filter 182, a sample adaptive offset (SAO) filter 184, and an adaptive loop filter (ALF) 186 in whole or in part.

The deblocking filter 182 filters boundaries between reconstructed blocks to remove blocking artifacts caused by block-by-block encoding/decoding, while the SAO filter 184 and ALF 186 perform additional filtering on the deblocked filtered image. The SAO filter 184 and ALF 186 are filters used to compensate for differences between the reconstructed pixels and original pixels caused by lossy coding. The SAO filter 184 applies an offset in CTUs to improve subjective image quality as well as encoding efficiency. The ALF 186, on the other hand, performs filtering on a block-by-block basis by applying different filters by differentiating between the edges of the block and the amounts of change to compensate for the distortion. Information on the filter coefficients to be used in the ALF may be encoded and signaled to the video decoding apparatus.

The reconstructed blocks filtered through the deblocking filter 182, SAO filter 184, and ALF 186 are stored in memory 190. Once all blocks within a picture have been reconstructed, the reconstructed picture may be used as a reference picture for inter predicting blocks within the subsequent picture to be encoded.

Figure 5:
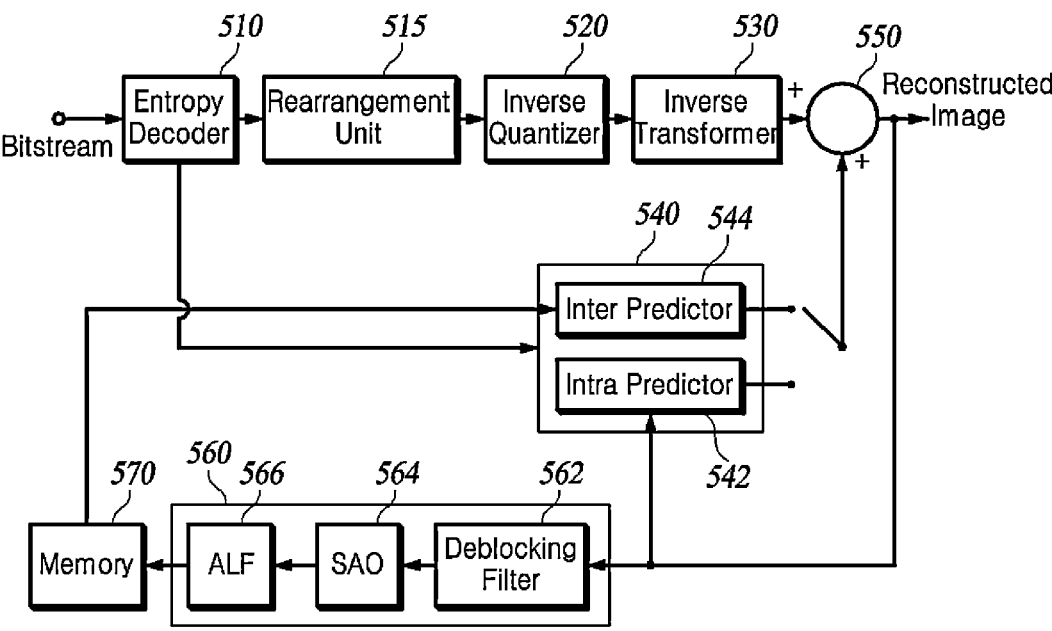
FIG. 5 is a block diagram illustrating a video decoding apparatus capable of implementing the techniques of the present disclosure.

FIG. 5 is a block diagram illustrating a video decoding apparatus capable of implementing the techniques of the present disclosure. The video decoding apparatus and its subcomponents are described below with reference to FIG. 5.

The video decoding apparatus may be configured to include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, the respective components of the video decoding apparatus may be implemented in hardware or software, or a combination of hardware and software. Additionally, the functions of each component may be implemented in software and a microprocessor may be implemented to execute the functions of the software corresponding to each component.

The entropy decoder 510 decodes the bitstream generated by the video encoding apparatus and extracts information related to block partition to determine the current block to be decoded, and the entropy decoder 510 extracts information including prediction information and information on residual signals required to reconstruct the current block.

The entropy decoder 510 extracts information on the CTU size from the Sequence Parameter Set (SPS) or Picture Parameter Set (PPS) to determine the size of the CTU and divides the picture into CTUs of the determined size. Then, the entropy decoder 510 determines CTU to be the top layer of the tree structure, i.e., the root node, extracts the partition information for the CTU, and thus splits the CTU by using the tree structure.

For example, when splitting a CTU by using the QTBTTT (QuadTree plus BinaryTree TernaryTree) structure, the entropy decoder 510 may extract a first flag (QT_split_flag) related to the split of the QT first to split each node into four nodes of the sublayer. Then, for the nodes corresponding to the leaf nodes of QT, the entropy decoder 510 extracts the second flag (MTT_split_flag) related to the split of MTT and the split direction (vertical/horizontal) and/or split type (binary/ternary) information to split the leaf nodes into MTT structures. Accordingly, each node below the leaf nodes of the QT is recursively partitioned into BT or TT structures.

As another example, when splitting a CTU by using the QTBTTT structure, the entropy decoder 510 may first extract a CU split flag (split_cu_flag), which indicates whether the CU is split, and if yes, the entropy decoder 510 may extract a first flag (QT_split_flag). During the split process, each node may have zero or more repeated QT splits followed by zero or more repeated MTT splits. For example, a CTU may enter MTT splits immediately, or conversely, the CTU may enter only multiple QT splits.

As yet another example, when splitting a CTU by using the QTBT (QuadTree plus BinaryTree) structure, the entropy decoder 510 extracts a first flag (QT_split_flag) associated with the split of the QT to split each node into four nodes of the sublayer. Then, with respect to the nodes corresponding to the leaf nodes of the QT, the entropy decoder 510 extracts the split flag (split_flag) indicating whether to further split into BTs and the split direction information.

Meanwhile, upon determining the current block to be decoded by using the partitioning of the tree structure, the entropy decoder 510 extracts information on the prediction type that indicates whether the current block is intra-predicted or inter-predicted. When the prediction type information indicates intra prediction, the entropy decoder 510 extracts a syntax element for the intra prediction information (intra-prediction mode) of the current block. When the prediction type information indicates inter prediction, the entropy decoder 510 extracts a syntax element for the inter prediction information, i.e., information indicating a motion vector and a reference picture to which the motion vector refers.

Further, the entropy decoder 510 extracts quantization-related information and, as information on the residual signal, information on the quantized transform coefficients of the current block.

The rearrangement unit 515 may change the sequence of one-dimensional quantized transform coefficients entropy decoded by the entropy decoder 510 into a two-dimensional coefficient array (i.e., a block) in the reverse order of the coefficient scanning sequence performed by the video encoding apparatus.

The inverse quantizer 520 inversely quantizes the quantized transform coefficients and uses quantization parameters to inversely quantize the quantized transform coefficients. The inverse quantizer 520 may apply different quantization coefficients (scaling values) to the quantized transform coefficients arranged in two dimensions. The inverse quantizer 520 may perform inverse quantization by applying a matrix of quantization coefficients (scaling values) from the video encoding apparatus to the two-dimensional array of quantized transform coefficients.

The inverse transformer 530 inverse-transforms the inverse-quantized transform coefficients from its frequency domain to those in the spatial domain to reconstruct the residual signals and thus to generate a residual block of the current block.

Furthermore, when the inverse transformer 530 inverse-transforms only a partial region (subblock) of the transform block, the inverse transformer 530 extracts a flag (cu_sbt_flag) indicating that only a subblock of the transform block is transformed, the subblock's directional (vertical/horizontal) information (cu_sbt_horizontal_flag), and/or the subblock's position information (cu_sbt_pos_flag). The inverse transformer 530 also inverse-transforms the transform coefficients of that subblock from its frequency domain to those of the space domain to reconstruct the residual signals, fills areas that are not inverse-transformed with "0" values for the residual signals, and thus generates the final residual block of the current block.

Further, when MTS is applied, the inverse transformer 530 uses the MTS information (mts_idx) signaled from the video encoding apparatus to determine a transform function or a transform matrix to be applied in the horizontal and vertical directions, respectively. The inverse transformer 530 also uses the determined transform function to perform an inverse-transform on the transform coefficients in the transform block in the horizontal and vertical directions.

The predictor 540 may include an intra predictor 542 and an inter predictor 544. The intra predictor 542 is activated when the prediction type of the current block is intra prediction, and the inter predictor 544 is activated when the prediction type of the current block is inter prediction.

The intra predictor 542 determines, among a plurality of intra-prediction modes, the intra-prediction mode of the current block from the syntax element for the intra-prediction mode extracted from the entropy decoder 510 and predicts the current block by using reference pixels around the current block according to the intra-prediction mode.

The inter predictor 544 uses the syntax element for the inter-prediction mode extracted from the entropy decoder 510 to determine the motion vector of the current block and a reference picture to which the motion vector refers and to predict the current block by using the motion vector and the reference picture.

The adder 550 adds the residual block outputted from the inverse transformer and the prediction block outputted from the inter predictor or the intra predictor to reconstruct the current block. The pixels in the reconstructed current block are utilized as reference pixels for intra predicting the block to be subsequently decoded.

The loop filter unit 560 may include a deblocking filter 562, an SAO filter 564, and an ALF 566 as in-loop filters. To remove blocking artifacts caused by block-by-block decoding, the deblocking filter 562 deblocks the boundaries between the reconstructed blocks. To compensate for differences between the reconstructed pixels and original pixels caused by lossy coding, the SAO filter 564 and ALF 566 perform additional filtering on the reconstructed blocks after deblocking filtering. The filter coefficients of the ALF are determined by using the information on the filter coefficients decoded from the bitstream.

The reconstructed blocks filtered through the deblocking filter 562, SAO filter 564, and ALF 566 are stored in memory 570. Once all blocks within a picture have been reconstructed, the reconstructed picture is used as a reference picture for inter predicting blocks within a picture to be subsequently encoded.

The following disclosure relates to an encoding tool and a decoding tool implemented by the video encoding apparatus and the video decoding apparatus as described above.

As described above, the conventional video encoding/decoding technology adopts a block-by-block based video encoding/decoding method, and the block is limited to a square or rectangular shape. However, since there are various edges such as oblique lines or curves within a picture, limiting the coding unit to a square or rectangular shape is a factor that reduces the encoding efficiency. On the other hand, when the block is split into various shapes by diagonal lines or curves, a large amount of data needs to be encoded and transmitted to the video decoder to represent the block boundaries, which will also reduce the encoding efficiency. Therefore, a method for efficiently encoding partition information is required for splitting blocks of various shapes in addition to splitting blocks of square or rectangular shapes.

The present disclosure, described below, provides a method of efficiently encoding pictures containing edges of various orientations by using arbitrarily shaped block partitioning, i.e., geometric block partitioning.

Figure 6A:
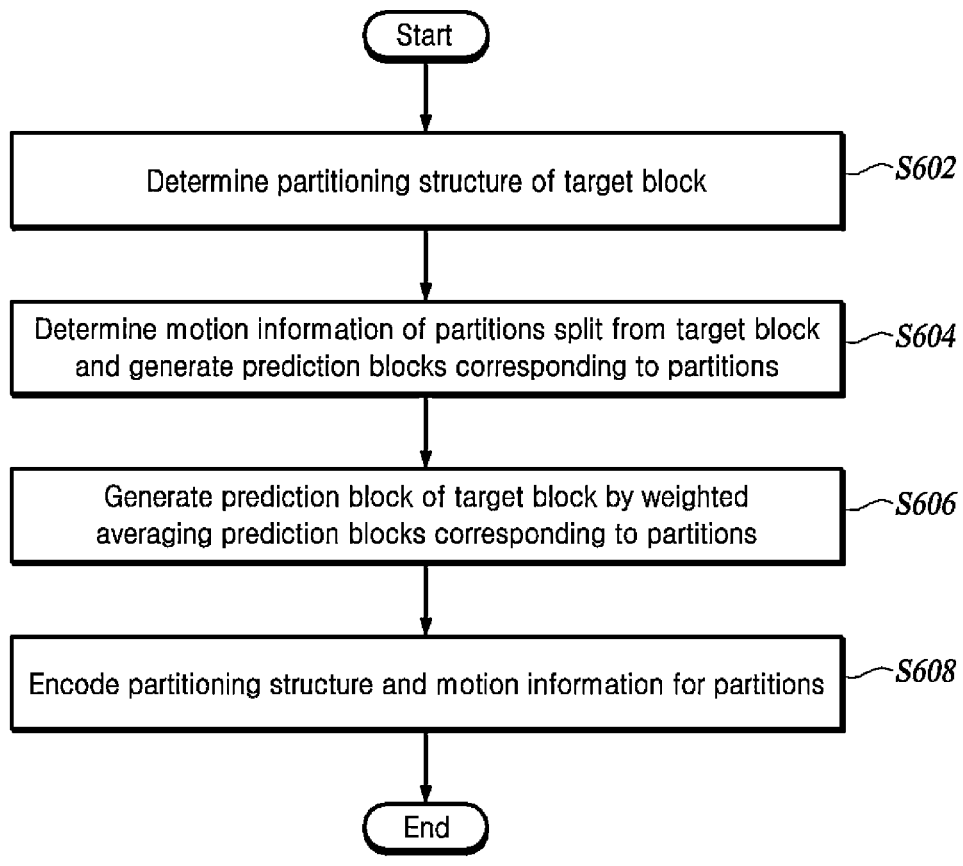
FIG. 6A is a schematic flowchart illustrating a method performed by a video encoding apparatus for predicting a block according to the present disclosure.

FIG. 6A is a schematic flowchart illustrating a method performed by a video encoding apparatus for predicting a block according to the present disclosure.

The video encoding apparatus determines a partitioning structure of the target block to be encoded (S602). Here, the target block may be a coding unit (CU) that is split into a tree structure from a coding tree block (CTU), and the partitioning structure refers to various types of splitting, including splitting by curved or oblique lines in addition to rectangular or rectangular splitting using vertical or horizontal lines. For each of the partitions that are split from the target block according to the partitioning structure, the video encoding apparatus determines motion information and uses the motion information to generate prediction blocks having the same size as the size of the target block (S604). The motion information is information for indicating or deriving the reference picture and the motion vector. The video encoding apparatus then generates a prediction block of the target block by weighted averaging the prediction blocks corresponding respectively to the partitions (S606). The partition information representing the partitioning structure and the motion information for the partitions are encoded and transmitted to the video decoding apparatus (S608).

FIG. 6B is a schematic flowchart illustrating a method performed by a video decoding apparatus for predicting a block according to the present disclosure.

The video decoding apparatus decodes the partition information received from the video encoding apparatus to determine the partitioning structure of the target block (S612). Then, based on the determined partitioning structure, the video decoding apparatus reconstructs motion information for the partitions split from the target block and generates prediction blocks corresponding respectively to the partitions (S614). The video decoding apparatus generates a prediction block of the target block by weighted averaging the prediction blocks corresponding to the partitions (S616).

In the following, a block prediction method according to the present disclosure is described in more detail.

Determining a Partitioning Structure

In some embodiments of the present disclosure, the video encoding apparatus may determine a partitioning structure of the target block by selecting one of a plurality of predetermined partitioning structures of various shapes, including a vertical split, a horizontal split, an oblique split, a curved split, and the like. Additionally, the video encoding apparatus may encode, as partition information, an index indicating the selected partitioning structure among the plurality of partitioning structures. Alternatively, it may encode, as partition information, parameters for defining a straight line or a curved line that is a boundary line for splitting the target block.

In another embodiment of the present disclosure, the video encoding apparatus may determine a partitioning structure for a target block by using a reference block in a previously encoded and previously decoded reference picture. The video encoding apparatus determines the partitioning structure of the reference block and sets the partitioning structure of the reference block to the partitioning structure of the target block. The video encoding apparatus further encodes, as partition information, motion information indicating the position of the reference block (hereinafter referred to as "initial motion information"). The initial motion information includes information on a reference picture containing a reference block to be referenced to determine the splitting structure of the target block, and information on an initial motion vector indicating the position of the reference block within the reference picture. The information on the reference picture and the information on the initial motion vector may be signaled at the target block level, such as at the coding unit level. Alternatively, the information on the initial motion vector may be signaled at the target block level and the information on the reference picture may be signaled at a level higher than the target block, such as at the slice or picture level. In this case, all target blocks within a slice or picture share the same reference picture. The video decoding apparatus determines the reference block by using the initial motion information received from the video encoding apparatus. Then, the video decoding apparatus determines the partitioning structure of the reference block in the same manner as the video encoding apparatus and sets the partitioning structure of the reference block to the partitioning structure of the target block.

In one example, the partitioning structure of the reference block may be determined by analyzing pixel values within the reference block and thereby determining a split boundary of the target block. An example may recognize an object within the reference block and may set the object boundary to a split boundary.

Figure 7:
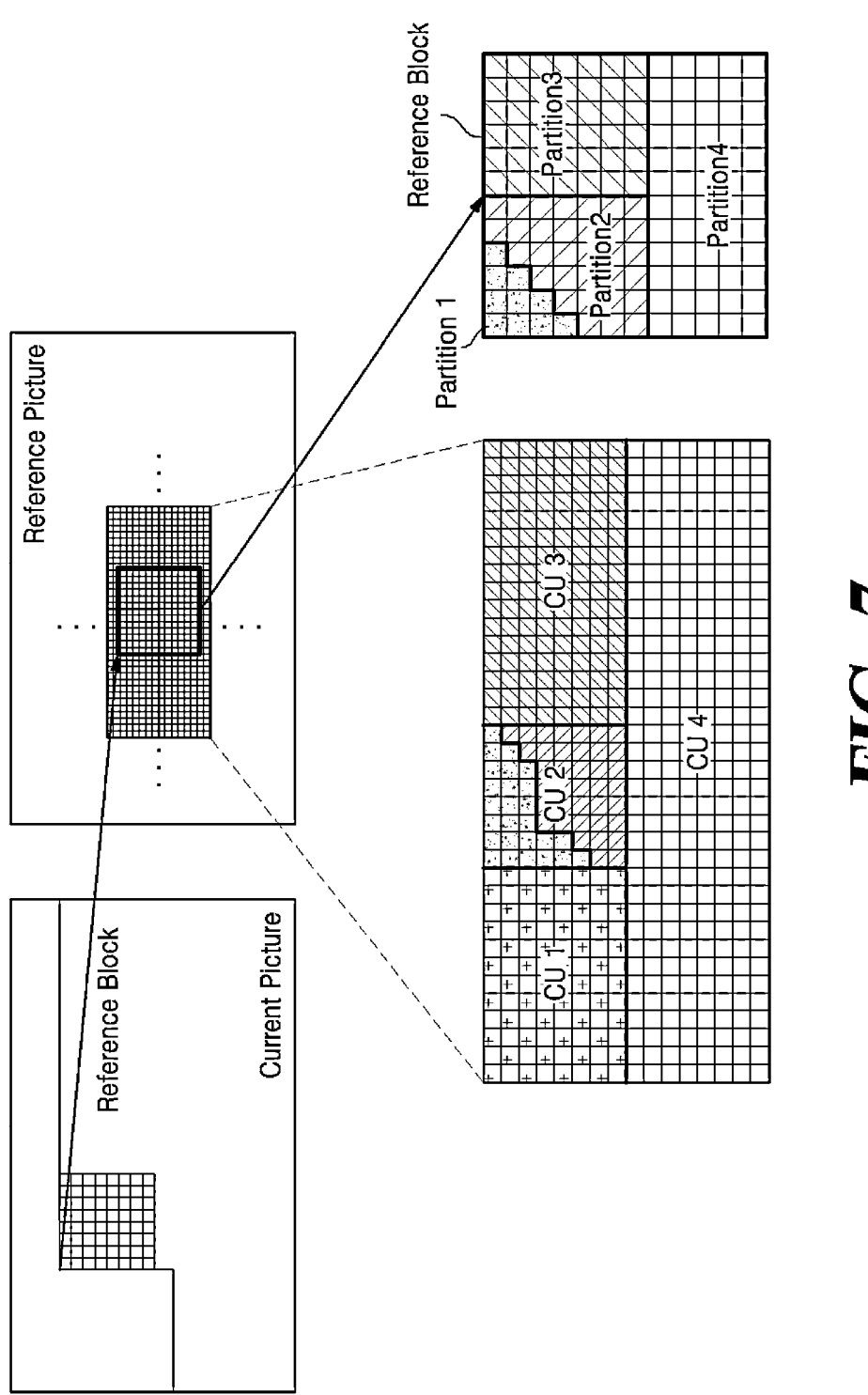
FIG. 7 is a diagram illustrating a method of determining a partitioning structure of a reference block according to the present disclosure.

As another example, the partitioning structure of the reference block may be determined based on partition information prestored in relation to a reference picture containing the reference block. As previously described, the picture is partitioned into CTUs, which are then partitioned into CUs by using a tree structure. Furthermore, the CUs may be further divided into various shapes according to the splitting methods presented in this disclosure. Using this information regarding the splitting of the reference picture allows to determine how the reference blocks in the reference picture are split. Referring to the example in FIG. 7, according to the tree structure split, the reference picture includes coding unit 1 (CU 1), coding unit 2 (CU 2), coding unit 3 (CU 3), and coding unit 4 (CU 4). The coding unit 2 (CU 2) is split into two partitions according to the method of the present disclosure. The reference block indicated by the initial motion information includes pixels in coding units 2 to 4 and includes pixels in the two partitions of coding unit 2. Thus, one can see that the reference block indicated by the initial motion vector includes a total of four regions. The reference block has a partitioning structure that is divided into four partitions by using the boundaries between the four regions as split boundaries.

In yet another embodiment of the present disclosure, the video encoding apparatus selects a partitioning structure of a target block from a plurality of predetermined partitioning structures. Further, it selects a partitioning structure of a reference block associated with the initial motion information from the plurality of predetermined partitioning structures in the manner described above. The video encoding apparatus encodes the partition information including the initial motion information along with a difference between an index corresponding to the partitioning structure of the target block and an index corresponding to the partitioning structure of the reference block. The video decoding apparatus utilizes the initial motion information included in the partition information to select the partitioning structure of the reference block from among the predetermined partitioning structures. The video decoding apparatus adds the difference between the index corresponding to the selected partitioning structure and the index received from the video decoding apparatus and thus calculates an index corresponding to the partitioning structure of the target block.

Meanwhile, when determining the partitioning structure of the reference block, constraints may exist. An example may not allow a partition containing a certain number of pixels below a threshold. Another example may allow the number of partitions split from the reference block to be limited below a threshold.

The video encoding apparatus may signal a flag to the video decoding apparatus indicating whether to apply the above-described method of determining the partitioning structure of the target block by using the partitioning structure of the reference block. The flag may be optionally signaled based on the size of the target block. For example, when the width and height of the target block are each less than a predetermined first threshold, the flag is not signaled, and the target block is not applied with the method of determining the partitioning structure of the target block by using the partitioning structure of the reference block. As another example, when the width and height of the target block are greater than a predetermined second threshold, the flag is not signaled, and the target block is not applied with the method of determining the partitioning structure of the target block by using the partitioning structure of the reference block.

The partition information may further include information on the number of partitions to be split from the target block. The reference block has a partitioning structure that is split into a certain number of partitions as indicated by that information. When the number of partitions to be split from the target block is limited to K or fewer, the information on the number of partitions may be represented by one or more flags. For example, when K=4, the first flag (seg_2_flag) indicating whether the number of partitions is 2 is firstly encoded. When the first flag is 1, the number of partitions is set to 2. When the first flag is 0, encoded is the second flag (seg_3_flag), which indicates whether the number of partitions is 3. When the second flag is 1, the number of partitions is set to 3. Otherwise, the number of partitions is set to 4.

2. Generating Prediction Blocks Corresponding Respectively to Partitions

After the partitioning structure in which the target block is divided into a plurality of partitions is determined, the motion information associated with each partition is determined. The video encoding apparatus determines and encodes the motion information corresponding to each partition and transmits the motion information to the video decoding apparatus. Then, the video decoding apparatus decodes the received information to reconstruct the motion information corresponding to each partition. The video decoding apparatus uses the reconstructed motion information to generate a prediction block corresponding to each partition. The prediction block corresponding to each partition may be equal in size to the target block. In other words, the video decoding apparatus generates a prediction block of the same size as the target block by using the motion vector corresponding to each partition.

Figure 8A:
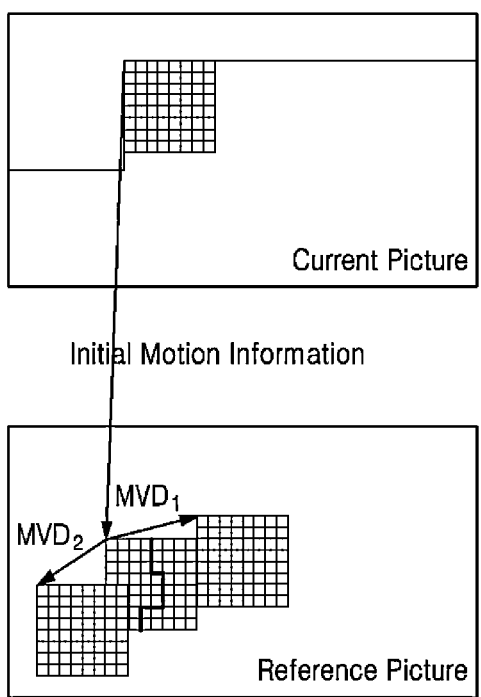
FIGS. 8A through 8C illustrate a method of determining motion information for partitions split from a target block according to the present disclosure.

In some embodiments of the present disclosure, the motion vector corresponding to each partition may be represented as a differential value between an initial motion vector. Referring to FIG. 8A, where the target block is split into two partitions, the video encoding apparatus computes a differential motion vector $(MVD_1, MVD_2)$ between the motion vector of each partition and the initial motion vector and encodes information on the differential motion vector of each partition. The video decoding apparatus generates a motion vector corresponding to each partition by adding the differential motion vector $(MVD_1, MVD_2)$ and the initial motion vector. Then, using the motion vectors corresponding to each partition, the video decoding apparatus derives a prediction block corresponding to each partition from a reference picture including a reference block indicated by the initial motion vector.

In this embodiment, the video encoding apparatus may encode none other than the values of each of the x-component and y-component of the differential motion vector as information on the differential motion vector $(MVD_1, MVD_2)$. Alternatively, the video encoding apparatus may encode, as information on the differential motion vector, the indices representing the direction and distance of the differential motion vector, respectively, among a plurality of predetermined directions and distances.

FIG. 9 illustrates tables representing a predefined plurality of directions and distances associated with a differential motion vector, respectively. In the example of FIG. 9, the direction table includes a total of eight directions and the distance table includes a total of four distances. The video encoding apparatus encodes an index $(dir_{index})$ indicating a direction of the differential motion vector among the plurality of predetermined directions and encodes an index $(dis_{index})$ indicating a distance of the differential motion vector among the plurality of distances. The video decoding apparatus utilizes the direction index $(dir_{index})$ and the distance index $(dis_{index})$ to calculate the differential motion vector and derives the motion vector for each partition by adding the differential motion vector and the initial motion vector. For example, when the motion vector of partition 1 is $mv_{section1}=(mvX_{section1}, mvY_{section1})$ and the motion vector of partition 2 is $mv_{section2}=(mvX_{section2}, mvY_{section2})$, the motion vectors of partitions 1 and 2 may be calculated by using the following equation.

$$mvX_{section1}=(mvX_{initial}+(SignX(dir_{index\_1}) \times Distance(dis_{index\_1})))$$

$$mvY_{section1}=(mvY_{initial}+(SignY(dir_{index\_1}) \times Distance(dis_{index\_1})))$$

$$mvX_{section2}=(mvX_{initial}+(SignX(dir_{index\_2}) \times Distance(dis_{index\_2})))$$

$$mvY_{section2}=(mvY_{initial}+(SignY(dir_{index\_2}) \times Distance(dis_{index\_2})))$$

<div align="right">Equation 1</div>

Here, $(mvX_{initial}, mvY_{initial})$ means an initial motion vector, $dir_{index\_1}$ and $dis_{index\_1}$ are indices indicating a direction and distance of the differential motion vector corresponding to partition 1, respectively, and $dir_{index\_2}$ and $dis_{index\_2}$ mean indices indicating a direction and distance of the differential motion vector corresponding to partition 2, respectively.

Figure 8B:
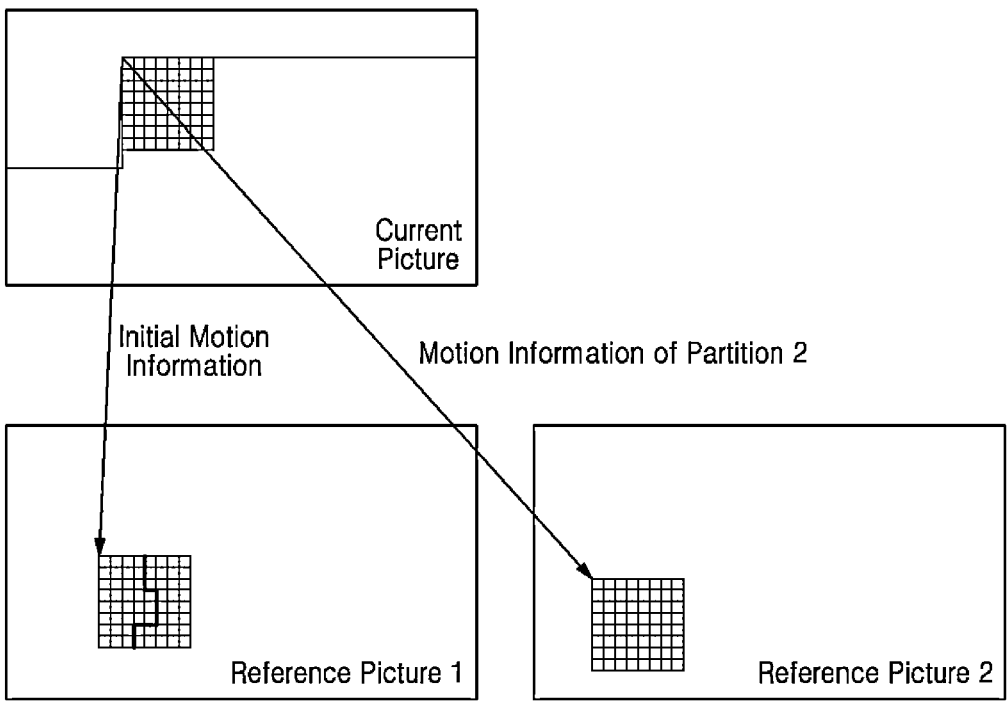

In some other embodiments of the present disclosure, the video encoding apparatus may set the motion vector of one of the plurality of partitions split from the target block as the initial motion vector, as shown in FIG. 8B. Namely, the video encoding apparatus generates a prediction block corresponding to the one partition by using a reference block in the reference picture indicated by the initial motion vector. Thus, the video encoding apparatus determines and encodes motion information for determining the motion vector and reference picture for the remaining partitions only. The video decoding apparatus, like the video encoding apparatus, sets the motion vector of one of the plurality of partitions as the initial motion vector. Then, as for the partition of which motion vector is set as the initial motion vector, the video decoding apparatus generates a prediction block by using the reference block in the reference picture indicated by the initial motion vector. For the remaining partitions, the video decoding apparatus uses the motion information received from the video encoding apparatus to determine the reference picture and the motion vector for the relevant partition.

In one example, the motion information corresponding to the remaining partitions may be encoded using the above-described merge mode. For example, the video encoding apparatus may construct a merge candidate list from the neighboring blocks of the target block and may encode a merge index for selecting one of the merge candidates included in the merge candidate list. After constructing the merge candidate list in the same manner as the video encoding apparatus, the video decoding apparatus sets the reference picture and motion vector of the merged candidate indicated by the merged index to the reference picture and motion vector of the relevant partition. Then, the video decoding apparatus uses the reference picture and motion vector set for the partition to generate a prediction block corresponding to the partition.

This embodiment may select the partition corresponding to the initial motion vector among the plurality of partitions through a predefined rule. For example, among the split partitions, the partition that is positioned in the top leftmost part of the target block, the partition with the largest number of pixels, or the partition containing an object may be set as the partition corresponding to the initial motion vector.

Figure 8C:
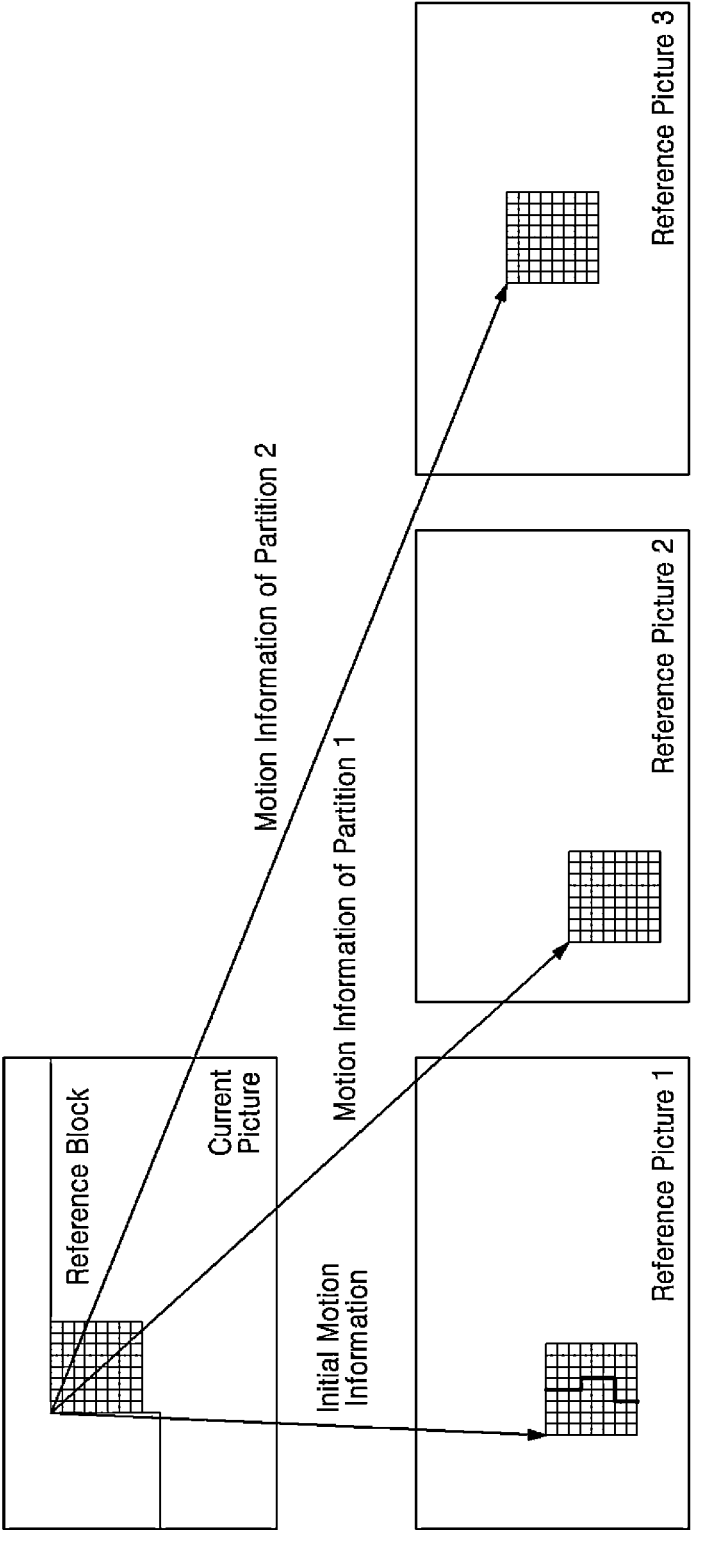

In some other embodiments of the present disclosure, the video encoding apparatus may encode motion information for each of the partitions split from the target block, as shown in FIG. 8C. For each partition, the video encoding apparatus generates a prediction block corresponding to that partition by using the reference picture and motion vector associated with the motion information. The video decoding apparatus decodes the motion information for each partition received from the video encoding apparatus and generates a prediction block corresponding to that partition by using the reference picture and the motion vector indicated or derived by the decoded motion information. The motion information may be encoded using the merge mode as described above.

3. Generating a Prediction Block of Target Block By Using Weighted Average

After the prediction blocks corresponding to each partition are generated, the video encoding apparatus and the video decoding apparatus generate the prediction blocks for the target block by weighted summing or weighted averaging the prediction blocks corresponding respectively to the partitions.

Figure 10C:
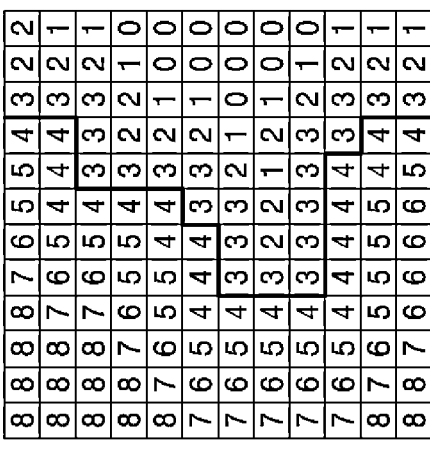
FIG. 10A, FIG. 10B, and FIG. 10C are diagrams illustrating setting weights based on pixel positions in a prediction block corresponding to a partition split from a target block according to the present disclosure.
Figure 10B:
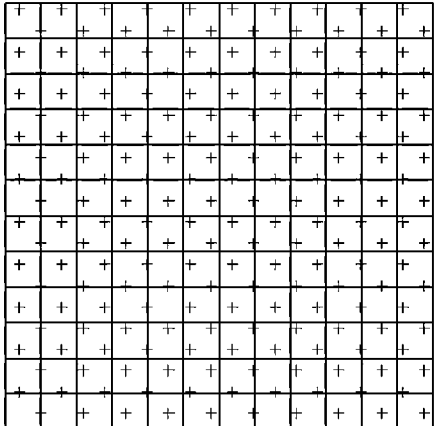
Figure 10A:
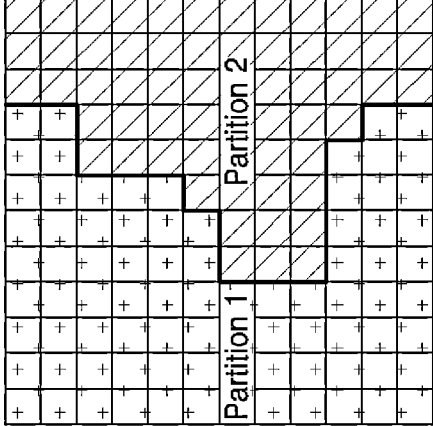

The weights for the weighted averaging may be set differently based on pixel positions within the prediction blocks corresponding to the partitions. For example, when the target block is split into two partitions, the weight for a pixel in the prediction block corresponding to partition 1 is variably determined based on whether the pixel is located within partition 1, the distance from the split boundary between partitions 1 and 2, etc. In other words, the weight for a pixel in the prediction block corresponding to partition 1 is determined based on the position of the pixel relative to the split boundary between partitions 1 and 2. FIG. 10A, FIG. 10B, and FIG. 10C are diagrams illustrating setting weights based on pixel positions in a prediction block corresponding to a partition. When the target block is split into two partitions, as shown in FIG. 10A, the prediction block for partition 1 has the size of the target block, as shown in FIG. 10B. The weights for the pixels in the prediction block of partition 1 are assigned by the following principle as illustrated in FIG. 10C.

(1) Pixels within partition 1 are assigned higher weights than those of pixels within partition 2.

(2) Pixels within partition 1 are assigned the greater weights the farther they are from the split boundary.

(3) Pixels within partition 2 are assigned the smaller weights the farther they are from the split boundary.

Meanwhile, the weight for a pixel in the prediction block corresponding to partition 2 is set equal to a certain value minus the weight for a co-located pixel in the prediction block corresponding to partition 1. For example, in the example of FIG. 10A, FIG. 10B, and FIG. 10C, if the weight corresponding to the pixel position (i, j) in partition 1 is $w_1$ (i, j), the weight $w_2$ (i, j) for the co-located pixel in partition 2 may be set equal to $8-w_1$ (i, j).

With this weighting method, the video decoding apparatus may assign, for a prediction block generated by the motion vector of partition 1, greater weights to the pixels in that prediction block in the region of partition 1 and may assign, for a prediction block generated by the motion vector of partition 2, greater weights to the pixels in that prediction block in the region of partition 2. Furthermore, the above-described weighting method may have the effect of removing artifacts that may occur at the split boundary.

However, the split boundaries of the partitions may be boundaries (or edges) between real objects. In this case, it may be desirable to preserve the real edges rather than smoothing around the split boundaries. Another aspect of the present disclosure provides a method for determining the type of a split boundary by using pixels near the boundary and adaptively assigning weights based on the determined type.

The video encoding apparatus and the video decoding apparatus generate a first parameter by using the pixel values adjacent to the split boundary in the prediction block generated for partition 1 and generate a second parameter by using the pixel values adjacent to its split boundary in the prediction block generated for partition 2. The difference between the first parameter and the second parameter determines the split boundary type. The pixels used to derive the first parameter may be limited to pixels located within partition 1 among the pixels adjacent to the split boundary. Similarly, the pixels used to derive the second parameter may be limited to pixels located within partition 2 among the pixels adjacent to its split boundary.

FIG. 11A, FIG. 11B, FIG. 11C, FIG. 11D, and FIG. 11E are diagrams respectively illustrating a method of deriving parameters for determining a split boundary type between partitions.

Figures 11A, 11B, 11C, 11D, 11E:
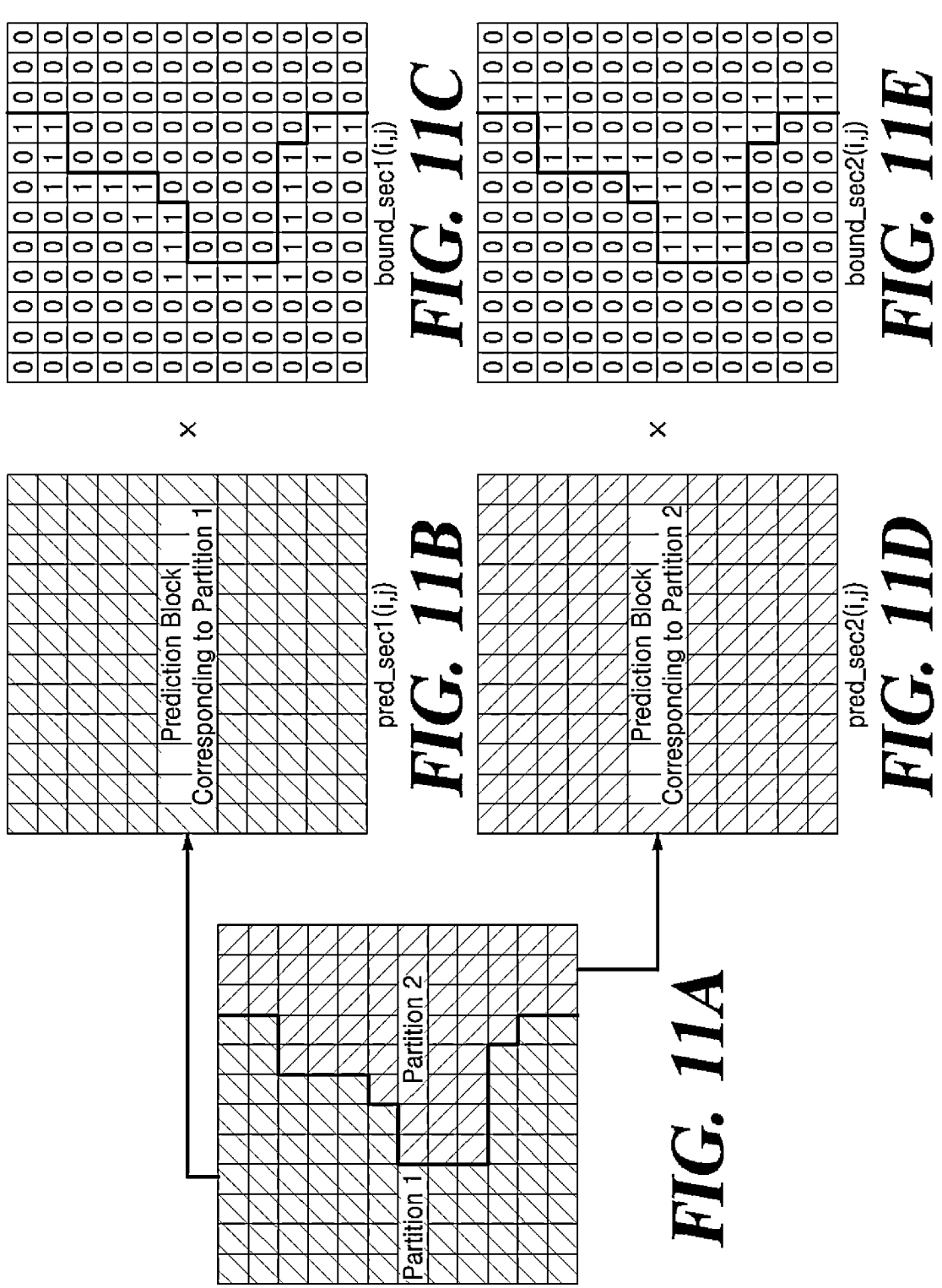
FIG. 11A, FIG. 11B, FIG. 11C, FIG. 11D, and FIG. 11E are diagrams illustrating a method of deriving parameters for determining a split boundary type between partitions.

The video encoding apparatus and the video decoding apparatus scan the target block by using a window of size M×N, where M and N are integers greater than or equal to 2. For example, a window of size 2×2 may be used. When the 2×2 window includes both pixels in partition 1 and pixels in partition 2 (as shown in FIG. 11A), the video encoding apparatus assign value 1 to the pixels in partition 1 within the 2×2 window. They assign the value 0 to other pixels. In this way, the video encoding apparatus derive the split boundary map (bound_sec1(i, j)) for partition 1 (as shown in FIG. 11C). Similarly, a split boundary map (bound_sec2(i, j)) for partition 2 may be derived (as shown in FIG. 11E). Namely, if a 2×2 window contains both pixels in partition 1 and pixels in partition 2, the video encoding apparatus assign value 1 to the pixels that belong to partition 1 in the 2×2 window. Other pixels are assigned the value 0.

Then, the video encoding apparatus and the video decoding apparatus calculate the first parameter (A) by multiplying the first prediction block (pred_sec1(i, j)) (as shown in FIG. 11B) corresponding to partition 1 by the split boundary map (bound_sec1(i, j)) (as shown in FIG. 11C). The video encoding apparatus and the video decoding apparatus calculate the second parameter (B) by multiplying the second prediction block (pred_sec2(i, j)) (as shown in FIG. 11D) corresponding to partition 2 by the split boundary map (bound_sec2(i, j)) (as shown in FIG. 11E). The first parameter (A) and the second parameter (B) may be calculated through Equation 2.

$$A = \frac{1}{\sum_i \sum_j \text{bound\_sec1}(i, j)} \times$$
$$\sum_i \sum_j \text{bound\_sec1}(i, j) \times \text{pred\_sec1}(i, j)$$

$$B = \frac{1}{\sum_i \sum_j \text{bound\_sec2}(i, j)} \times \sum_i \sum_j \text{bound\_sec2}(i, j) \times \text{pred\_sec2}(i, j)$$

Equation 2

As shown in Equation 2, the first parameter (A) is derived by averaging the cell values adjacent to the split boundary within the first prediction block corresponding to partition 1, and the second parameter (B) is derived by utilizing the pixel values adjacent to the split boundary within the second prediction block corresponding to partition 2.

The video encoding apparatus and the video decoding apparatus compare the absolute values of A-B with the threshold values ($\text{thr}_{min}$ and $\text{thr}_{max}$) to determine the split boundary type. For example, if |A−B| is less than or equal to $\text{thr}_{min}$, the split boundary type is classified as type 1 (smooth edge), if |A−B| is greater than $\text{thr}_{min}$ and less than or equal to $\text{thr}_{max}$, it is classified as type 2 (normal edge), and if |A−B| is less than or equal to $\text{thr}_{min}$, it is classified as type 3 (sharp edge).

Weights are assigned such that the more the type goes from type 1 to type 2 to type 3 the greater the weight difference between different regions adjacent to the split boundary. FIG. 12A and FIG. 12B are illustrations of assigning weights based on the split boundary type. With a normal edge, the weights change progressively across the split boundary. Referring to FIG. 12A, starting with weights of 4 at the split boundary, the weights gradually increase toward partition 1 (the left side of FIG. 12A) and gradually decrease toward partition 2 (the right side of FIG. 12A). With a sharp edge, the weights change abruptly at the split boundary. Referring to FIG. 12B, weights of 8 are assigned to the entire region of partition 1 and weights of 0 to the entire region of partition 2.

Once the weights are determined based on the split boundary type, the video encoding apparatus and the video decoding apparatus generate, by using the determined weights, the prediction block of the target block by weighted averaging the prediction blocks corresponding to the partitions. For example, Equation 3 may be used.

$$\text{Pred\_final}(i,j) = (\text{weight}(i,j) \times \text{pred\_sec1}(i,j) + (8 - \text{weight}(i,j)) \times \text{pred\_sec2}(i,j)) >> 3$$

Equation 3 where weight(i, j) means the weight assigned to the pixel (pred_sec1(i, j)) at position (i, j) in the prediction block corresponding to partition 1. ">>" indicates a right shift operation. ">>3" is equivalent to a division operation by 8, the sum of the weights.

Figures 13A, 13B, 13C:
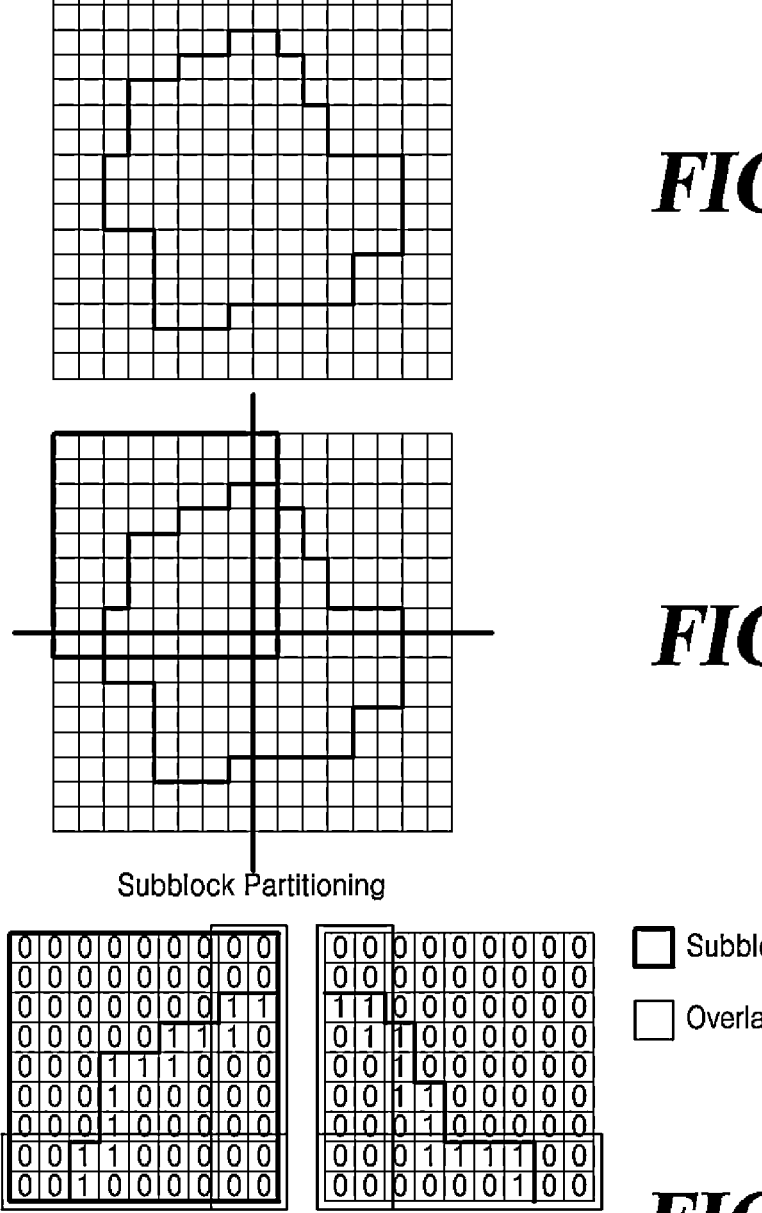
FIG. 13A, FIG. 13B, and FIG. 13C are diagrams illustrating another embodiment of setting weights according to the present disclosure.

FIG. 13A, FIG. 13B, and FIG. 13C are diagrams illustrating another embodiment of setting weights according to the present disclosure.

In this embodiment, the weights for the prediction blocks corresponding to the partitions may be determined for each subblock. Referring to FIGS. 13A and 13B, each subblock may be set to partially overlap with neighboring subblocks. The size of the subblock and the size of the overlap area may be varied depending on the size of the target block. As shown in FIG. 13C, the video encoding apparatus and the video decoding apparatus may determine the weights respectively for the subblocks in the same manner as described above. The weight for the overlap area may be generated by averaging the weights determined for the subblocks forming the overlap area.

The above description assumes that the target block is primarily split into two partitions. However, the present disclosure is not so limited, and the target block may be split into more than two partitions.

FIG. 14A, FIG. 14B, FIG. 14C, FIG. 14D, FIG. 14E, FIG. 14F, and FIG. 14G are diagrams illustrating a method of determining weights when a target block is split into three or more partitions.

Figure 14B:
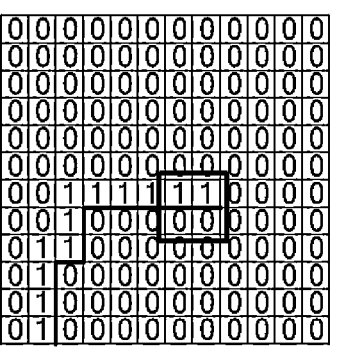
FIG. 14A, FIG. 14B, FIG. 14C, FIG. 14D, FIG. 14E, FIG. 14F, and FIG. 14G are diagram illustrating a method of determining weights when a target block is split into three or more partitions.
Figure 14C:
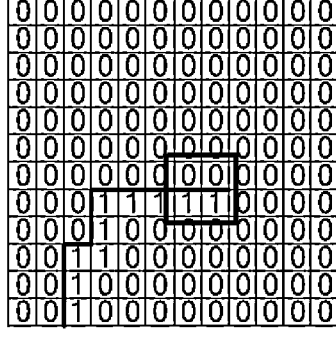
Figure 14A:
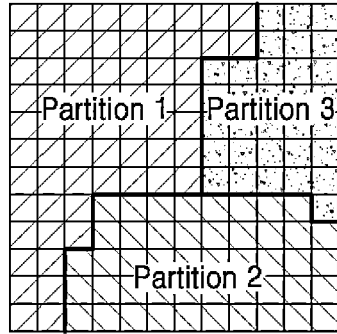
Figure 14D:
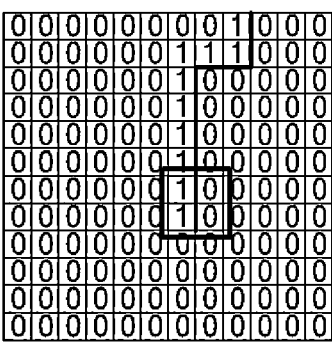
Figure 14E:
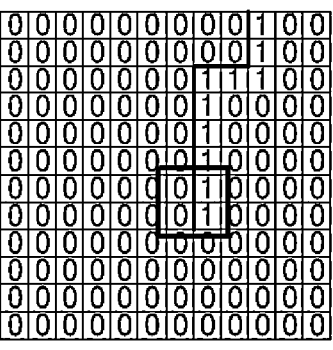
Figure 14F:
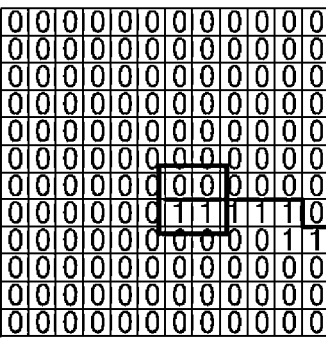
Figure 14G:
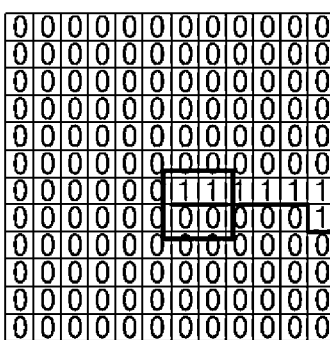

In FIG. 14, bound_sec_1_2_1(i, j) (as shown in FIG. 14B) represents a split boundary map for a prediction block in partition 1 relative to the reference of the boundary between partitions 1 and 2, and bound_sec_1_2_2(i, j) (as shown in FIG. 14C) represents a split boundary map for a prediction block in partition 2 relative to the reference of the boundary between the partitions 1 and 2.

As shown in FIG. 14, each partition may be separated from a plurality of partitions by split boundaries. For example, partition 1 forms split boundaries with partition 2 and partition 3, respectively. The split boundary maps for the prediction blocks of partition 1 are bound_sec_1_2_1(i, j) (as shown in FIG. 14B) generated for the boundary between partitions 1 and 2, and bound_sec_1_3_1(i, j) (as shown in FIG. 14D) generated for the boundary between partitions 1 and 3. Therefore, when the weights are obtained using each of the split boundary maps according to the method described above, pixel positions within the prediction block of partition 1 may each be given more than one weight. If one or more weights are assigned to a pixel, the final weight for that pixel may be determined by averaging or weight averaging the two or more weights.

It should be understood that the above description presents illustrative embodiments that may be implemented in various other manners. The functions described in some embodiments may be realized by hardware, software, firmware, and/or their combination. It should also be understood that the functional components described in this specification are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium includes, for example, all types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although exemplary embodiments of the present disclosure have been described for illustrative purposes, those having ordinary skill in the art should appreciate that various modifications, additions, and substitutions are possible, without departing from the idea and scope of the claimed invention. Therefore, exemplary embodiments of the present disclosure have been described for the sake of brevity and clarity. The scope of the technical idea of the embodiments of the present disclosure is not limited by the illustrations. Accordingly, one of ordinary skill should understand the scope of the claimed invention should not be limited by the above explicitly described embodiments but by the claims and equivalents thereof.

What is claimed is:

1. A video decoding method of decoding a target block, the method comprising:
   determining a partitioning parameter for the target block;
   reconstructing motion vectors, which correspond to a plurality of partitions split from the target block by the partitioning parameter of the target block;
   using the motion vectors to generate prediction blocks that respectively correspond to the partitions and are equal in size to the target block;
   generating a prediction block of the target block by weighted averaging the prediction blocks corresponding to the partitions; and
   reconstructing the target block based on the prediction block of the target block,
   wherein reconstructing the motion vectors comprises:
      determining an initial motion vector of a partition of the partitions;
      decoding information on a motion vector difference of the partition from a bitstream;
      reconstructing the motion vector difference based on the information on the motion vector difference; and
      deriving the motion vector of the partition by adding the initial motion vector to motion vector difference,
   wherein the information on the motion vector difference includes:
      a first syntax element, which is an index for indicating a distance of the motion vector difference among a plurality of pre-defined distances, and
      a second syntax element, which is an index for indicating a direction of the motion vector difference among a plurality of pre-defined directions, and
   wherein the plurality of pre-defined directions includes two horizontal directions, two vertical directions, and four diagonal directions.

2. The method of claim 1, wherein determining the partitioning parameter for the target block comprises:

decoding partition information from bitstream, wherein the partition information includes information related to the initial motion vector indicating a position of a reference region to be referred to for determining the partitioning parameter for the target block;
determining a partitioning structure of the reference region indicated by the initial motion vector, by using pixel values of pixels in the reference region; and
using the partitioning structure of the reference region to determine the partitioning parameter related to a partitioning structure of the target block.

3. The method of claim 1, wherein generating of the prediction block of the target block comprises:
   for a prediction block corresponding to a first partition split from the target block, determining weights for pixels in the prediction block corresponding to the first partition based on pixel positions that are relative to a boundary between the first partition and a second partition.

4. The method of claim 3, wherein determining of the weights for the pixels in the prediction block corresponding to the first partition comprises:
   generating a first parameter by using pixels adjacent to the boundary among the pixels in the prediction block corresponding to the first partition;
   generating a second parameter by using pixels adjacent to the boundary among the pixels in the prediction block corresponding to the second partition;
   determining a boundary type of the boundary among a plurality of boundary types by using a difference between the first parameter and the second parameter; and
   determining the weights based on a determined boundary type.

5. A video encoding method of encoding a target block, the method comprising:
   determining a partitioning parameter for the target block;
   determining motion vectors which correspond to a plurality of partitions split from the target block by the partitioning parameter;
   using the motion vectors to generate prediction blocks corresponding respectively to the partitions;
   generating a prediction block of the target block by weighted averaging the prediction blocks corresponding to the partitions;
   generating a residual block of the target block based on the prediction block of the target block; and
   encoding information on motion vectors corresponding respectively to the partitions, and information on the residual block,
   wherein encoding the information on the motion vectors comprises:
      determining an initial motion vector of a partition of the partitions; and
      encoding information on a motion vector difference of the partition into a bitstream, wherein the motion vector difference of the partition is a difference between a motion vector of the partition and the initial motion vector;
   wherein the information on the motion vector difference includes:
      a first syntax element, which is an index for indicating a distance of the motion vector difference among a plurality of pre-defined distances; and
      a second syntax element, which is an index for indicating a direction of the motion vector difference among a plurality of pre-defined directions, and wherein the plurality of pre-defined directions includes two horizontal directions, two vertical directions, and four diagonal directions.

6. The method of claim 5, wherein determining the partitioning parameter for the target block comprises:

determining a partitioning structure of a reference region indicated by the initial motion vector, by using pixel values of pixels in the reference region; and using the partitioning structure of the reference region to determine the partitioning parameter related to a partitioning structure of the target block, wherein information on the initial motion vector is further encoded.

7. The method of claim 5, wherein generating of the prediction block of the target block comprises:

for a prediction block corresponding to a first partition split from the target block, determining weights for pixels in the prediction block corresponding to the first partition based on pixel positions that are relative to a boundary between the first partition and a second partition.

8. The method of claim 7, wherein determining of the weights for the pixels in the prediction block corresponding to the first partition comprises:

generating a first parameter by using pixels adjacent to the boundary among the pixels in the prediction block corresponding to the first partition;

generating a second parameter by using pixels adjacent to the boundary among the pixels in the prediction block corresponding to the second partition;

determining a boundary type of the boundary among a plurality of boundary types by using a difference between the first parameter and the second parameter; and determining the weights based on a determined boundary type.

9. A method for transmitting a bitstream containing encoded data of a target block, the method comprising:

generating the bitstream by encoding the target block; and transmitting the bitstream to a video decoding apparatus, wherein generating the bitstream comprises:

determining a partitioning parameter for the target block;

determining motion vectors which correspond to a plurality of partitions split from the target block by the partitioning parameter;

using the motion vectors to generate prediction blocks corresponding respectively to the partitions;

generating a prediction block of the target block by weighted averaging the prediction blocks corresponding to the partitions;

generating a residual block of the target block based on the prediction block of the target block; and encoding information on motion vectors corresponding respectively to the partitions, and information on the residual block, wherein encoding the information on the motion vectors comprises:

determining an initial motion vector of a partition of the partitions;

encoding information on a motion vector difference of the partition into a bitstream, wherein the motion vector difference of the partition is a difference between a motion vector of the partition and the initial motion vector;

wherein the information on the motion vector difference includes:

a first syntax element, which is an index for indicating a distance of the motion vector difference among a plurality of pre-defined distances, and a second syntax element, which is an index for indicating a direction of the motion vector difference among a plurality of pre-defined directions, and wherein the plurality of pre-defined directions includes two horizontal directions, two vertical directions, and four diagonal directions.

* * * * *